US012755906B2

(12) United States Patent
Tsubaki et al.

(10) Patent No.: US 12,755,906 B2
(45) Date of Patent: Oct. 6, 2026

(54) ELECTROLYTIC CAPACITOR AND LIQUID COMPONENT FOR ELECTROLYTIC CAPACITOR

(71) Applicant: Panasonic Intellectual Property Management Co., Ltd., Osaka (JP)

(72) Inventors: Yuichiro Tsubaki, Kyoto Fu (JP); Tatsuji Aoyama, Kyoto Fu (JP); Kazuyo Saito, Osaka Fu (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 161 days.

(21) Appl. No.: 18/723,795

(22) PCT Filed: Dec. 26, 2022

(86) PCT No.: PCT/JP2022/048000

§ 371 (c)(1),
(2) Date: Jun. 24, 2024

(87) PCT Pub. No.: WO2023/127826

PCT Pub. Date: Jul. 6, 2023

(65) Prior Publication Data

US 2025/0046528 A1 Feb. 6, 2025

(30) Foreign Application Priority Data

Dec. 27, 2021 (JP) ................................ 2021-212779
Dec. 27, 2021 (JP) ................................ 2021-212780

(51) Int. Cl.
*H01G 9/10* (2006.01)
*H01G 9/00* (2006.01)
(Continued)

(52) U.S. Cl.
CPC ............ *H01G 9/10* (2013.01); *H01G 9/0036* (2013.01); *H01G 9/048* (2013.01)

(58) Field of Classification Search
None
See application file for complete search history.

(56) References Cited

U.S. PATENT DOCUMENTS

2020/0203082 A1* 6/2020 Kubo ................ H01M 10/0525
2022/0262574 A1* 8/2022 Sakaguchi ............ H01G 9/028
2025/0046528 A1* 2/2025 Tsubaki .............. H01G 9/0036

FOREIGN PATENT DOCUMENTS

JP 2006-114540 A 4/2006
JP 2007-080888 A 3/2007
(Continued)

OTHER PUBLICATIONS

Translation of WO '019 (Year: 2019).*
(Continued)

*Primary Examiner* — Dion R. Ferguson
(74) *Attorney, Agent, or Firm* — Rimon P.C.

(57) ABSTRACT

An electrolytic capacitor includes a container with an opening, a capacitor element contained in the container, and a sealing body that seals the opening. The capacitor element includes an anode body provided with a dielectric layer on its surface, and a conductive polymer that covers a portion of the dielectric layer. The sealing body includes an elastic polymer. An antioxidant component is present in a space closed by the container and the sealing body. The antioxidant component includes a first antioxidant having no boiling point or a boiling point of 320° C. or higher.

19 Claims, 2 Drawing Sheets

(51) Int. Cl.
*H01G 9/048* (2006.01)
*H01G 9/15* (2006.01)

(56) References Cited

FOREIGN PATENT DOCUMENTS

| | | | | | |
|---|---|---|---|---|---|
| JP | 2009-215369 A | | 9/2009 | | |
| JP | 2013-225694 A | | 10/2013 | | |
| JP | 2016021453 A | * | 2/2016 | | |
| JP | 6462255 B2 | * | 1/2019 | | |
| JP | 7768879 B2 | * | 11/2025 | ............. | H01G 9/151 |
| WO | WO-2019027019 A1 | * | 2/2019 | ............. | H01G 9/025 |
| WO | WO-2022065434 A1 | * | 3/2022 | ............. | H01G 9/035 |
| WO | WO-2023127826 A1 | * | 7/2023 | ............. | H01G 9/151 |
| WO | WO-2023176392 A1 | * | 9/2023 | ............. | H01G 9/028 |

OTHER PUBLICATIONS

International Search Report dated Mar. 14, 2023 issued in International Patent Application No. PCT/JP2022/048000, with English translation.

* cited by examiner

ELECTROLYTIC CAPACITOR AND LIQUID COMPONENT FOR ELECTROLYTIC CAPACITOR

CROSS-REFERENCE OF RELATED APPLICATIONS

This application is the U.S. National Phase under 35 U.S.C. § 371 of International Patent Application No. PCT/JP2022/048000, filed on Dec. 26, 2022, which in turn claims the benefit of Japanese Patent Application No. 2021-212779, filed on Dec. 27, 2021, and Japanese Patent Application No. 2021-212780, filed on Dec. 27, 2021, the entire disclosures of which Applications are incorporated by reference herein.

TECHNICAL FIELD

The present disclosure relates to an electrolytic capacitor and a liquid component for an electrolytic capacitor.

BACKGROUND ART

Electrolytic capacitors that include an anode body provided with a dielectric layer and a conductive polymer covering at least a portion of the dielectric layer are regarded as promising small, high-capacity, low-ESR (equivalent series resistance) capacitors. The conductive polymer may be referred to as a solid electrolyte. The electrolytic capacitors may further include a liquid component such as a liquid electrolyte.

PTL 1 proposes use of a drive electrolytic solution in electrolytic capacitors, the drive electrolytic capacitor including an organic solvent, a solute, and an additive, an acid component of the solute including an organic acid and an inorganic acid, the content of the acid component is excessively larger than the content of a basic component in terms of the molar ratio. PTL 1 also proposes addition of an antioxidant to the electrolytic solution.

CITATION LIST

Patent Literature

[PTL 1] Japanese Laid-Open Patent Publication No. 2006-114540

SUMMARY OF INVENTION

Technical Problem

Electrolytic capacitors may be exposed to high temperatures during reflow and may be used under high-temperature environment in some applications. For example, electrolytic capacitors may be used under high-temperature environment, that is, inside engine compartments of vehicles (e.g., automobiles) or in the vicinities thereof. Accordingly, electrolytic capacitors are required to have a high heat resistance property.

Solution to Problem

An aspect of the present disclosure relates to an electrolytic capacitor including: a container with an opening;

a capacitor element contained in the container, and a sealing body that seals the opening, wherein the capacitor element includes an anode body provided with a dielectric layer on its surface, and a conductive polymer that covers a portion of the dielectric layer, the sealing body includes an elastic polymer, an antioxidant component is present in a space closed by the container and the sealing body, and the antioxidant component includes a first antioxidant having no boiling point or a boiling point of 320° C. or higher.

Another aspect of the present disclosure relates to a liquid component for an electrolytic capacitor, including:

a non-aqueous solvent; and an antioxidant component dissolved in the non-aqueous solvent, wherein the non-aqueous solvent includes at least an alcohol solvent, and the antioxidant component includes a first antioxidant having no boiling point or a boiling point of 320° C. or higher.

Advantageous Effects of Invention

The heat resistance property of electrolytic capacitors can be improved.

DESCRIPTION OF EMBODIMENTS

Figure 1:
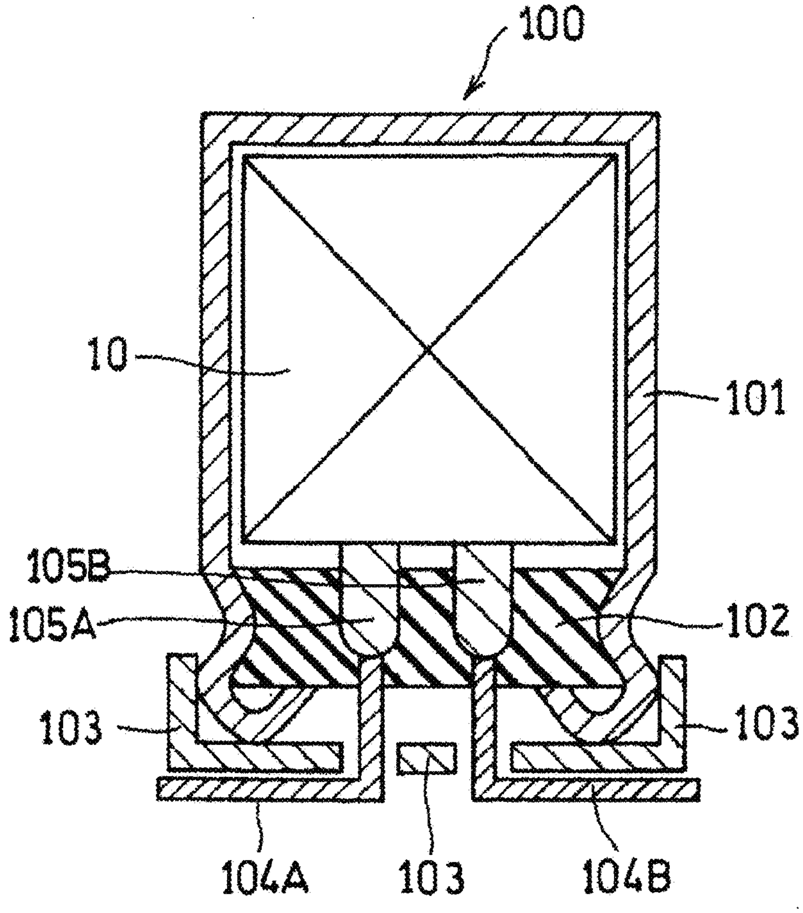
FIG. 1 is a schematic cross-sectional view of an electrolytic capacitor according to an embodiment of the present disclosure.

While novel features of the present invention are set forth particularly in the appended claims, the present invention, both as to organization and content, will be better understood and appreciated, along with other objects and features thereof, from the following detailed description taken in conjunction with the drawings.

When electrolytic capacitors are exposed to high temperatures, a conductive polymer is oxidatively deteriorated, which is likely to reduce the conductivity. In addition, electrolytic capacitors may have a structure in which a capacitor element and a liquid component such as a liquid electrolyte are contained in a container with an opening and the opening is sealed with a sealing body that includes an elastic polymer. Although the elastic polymer has high sealing ability, it has an insufficient heat resistance property and becomes brittle due to oxidative deterioration under high-temperature environment, which is likely to reduce the sealing function of the sealing body. In the electrolytic capacitors that includes the liquid component such as a liquid electrolyte, the sealing body may absorb a non-aqueous solvent (particularly an alcohol solvent or the like) included in the liquid component, and when the electrolytic capacitors are exposed to high-temperature environment under this condition, deterioration of the sealing body is likely to proceed. Deterioration of the sealing body results in cracks or flaws, and thus air is likely to enter the electrolytic capacitors. As a result, the oxidative deterioration of the conductive polymer and the oxidative deterioration of the sealing body are more likely to proceed. In addition, when the electrolytic capacitors are exposed to high temperatures, the non-aqueous solvent such as an alcohol solvent is likely to evaporate. As a result, the equivalent series resistance (ESR) may increase, or the capacitance may decrease.

In consideration of the matters above, (1) the electrolytic capacitor of the present disclosure includes a container with an opening, a capacitor element contained in the container, and a sealing body that seals the opening. The capacitor element includes an anode body provided with a dielectric layer on its surface, and a conductive polymer that covers a portion of the dielectric layer. The sealing body includes an elastic polymer. An antioxidant component is present in a space closed by the container and the sealing body. The antioxidant component includes a first antioxidant having no boiling point or a boiling point of 320° C. or higher.

As described above, in the present disclosure, the antioxidant component that includes the antioxidant (which may be referred to as a "first antioxidant" hereinafter) having no boiling point or a boiling point of 320° C. or higher is present inside the electrolytic capacitor (more specifically, in a space closed by the container and the sealing body). The first antioxidant itself can be easily reduced and is likely to react with radicals produced by the involvement of oxygen. In addition, the first antioxidant has no boiling point or a boiling point of 320° C. or higher, and therefore, even when the electrolytic capacitor is exposed to high temperatures, vaporization, decomposition, or the like is less likely to occur. Accordingly, the first antioxidant is present inside the electrolytic capacitor and reacts with radicals produced by the involvement of oxygen to deactivate the radicals, thus making it possible to suppress a reaction to deteriorate the conductive polymer and a reaction to deteriorate the sealing body by the involvement of oxygen.

In some types of antioxidant components, the oxidizing action of the antioxidant components may be deactivated by a component included in the conductive polymer or the liquid component. However, in the present disclosure, due to the first antioxidant with relatively high stability being included in the antioxidant component, the deactivation of the antioxidant component is suppressed, thus making it possible to allow the antioxidant component to effectively exhibit the effect of suppressing deterioration of the conductive polymer or the sealing body. In the present disclosure, even when the electrolytic capacitor includes a liquid component, the effect of suppressing deactivation of the antioxidant component is maintained due to a non-aqueous solvent that includes at least an alcohol solvent being included in the liquid component. Therefore, an increase in ESR or a decrease in capacitance when the electrolytic capacitor is exposed to high temperatures is suppressed. In other words, the heat resistance property of the electrolytic capacitor can be improved.

The antioxidant component is present inside the electrolytic capacitor in a state of, for example, being capable of coming into contact with radicals produced by the involvement of oxygen. In the electrolytic capacitor filled with a liquid component, the antioxidant component is in contact with the liquid component in many cases. For example, the liquid component may contain the antioxidant component. The antioxidant component may be dissolved or dispersed in the liquid component or may be included in a state of being incompatible with the liquid component (e.g., in a solid state or liquid state). At least a portion of the first antioxidant may be present in a state of being undissolved in the liquid component. For example, a portion of the antioxidant component (e.g., a portion of the first antioxidant) may be dissolved in the liquid component, and the remainder (e.g., the remainder of the first antioxidant) may be included in a state of being undissolved in the liquid component. A case where at least a portion of the antioxidant component is not dissolved in the liquid component includes that an incompatible antioxidant may be present in the liquid component in a state of floating or sinking in the liquid component (in other words, in a state of being in contact with the liquid component) depending on the relationship between the specific gravity of the antioxidant and the specific gravity of the liquid component. In addition, the antioxidant component may be included in a solid electrolyte layer that includes a conductive polymer.

(2) In (1) above, the electrolytic capacitor may include a solid electrolyte layer that includes the conductive polymer and covers a portion of the dielectric layer. The solid electrolyte layer may include the first antioxidant.

(3) In (1) or (2) above, a mass ratio of the first antioxidant to the conductive polymer (=first antioxidant/conductive polymer) may be 0.01 or more and 300 or less.

(4) In any one of (1) to (3) above, the conductive polymer may include a conjugated polymer and a dopant. A molar ratio of the first antioxidant to total monomer units of the conjugated polymer (=first antioxidant/total monomer units) may be 0.1 or more and 200 or less.

(5) In any one of (1) to (4) above, a mass ratio of the first antioxidant to the elastic polymer (=first antioxidant/elastic polymer) may be 0.001 or more and 1 or less.

(6) In (1) above, the electrolytic capacitor may further include a liquid component. The liquid component may include a non-aqueous solvent, and the non-aqueous solvent may include at least an alcohol solvent. At least a portion of the first antioxidant may be present in a state of being undissolved in the liquid component.

(7) A liquid component for an electrolytic capacitor of the present disclosure includes a non-aqueous solvent, and an antioxidant component dissolved in the non-aqueous solvent. The non-aqueous solvent includes at least an alcohol solvent. The antioxidant component includes a first antioxidant having no boiling point or a boiling point of 320° C. or higher.

(8) In (7) above, a concentration of the first antioxidant in the liquid component for an electrolytic capacitor may be 0.1 mass % or more and 50 mass % or less.

(9) In any one of (6) to (8) above, the alcohol solvent may at least include at least one (first alcohol solvent) selected from the group consisting of an alkylene glycol having 2 to 6 carbon atoms and glycerin.

(10) In (9) above, a mass ratio of the first antioxidant to the first alcohol solvent (=first antioxidant/first alcohol solvent) may be 0.005 or more and 2 or less.

(11) In any one of (6) to (10) above, a ratio of the alcohol solvent in the non-aqueous solvent may be 5 mass % or more and 100 mass % or less.

(12) In any one of (1) to (11) above, the first antioxidant may include at least one selected from the group consisting of a hydroxy group, a nitrogen atom, an oxygen atom, a sulfur atom, and a phosphorus atom.

(13) In any one of (1) to (12) above, the first antioxidant may at least include at least one selected from the group consisting of a phenol antioxidant IA having a phenolic hydroxy group and a phosphorus antioxidant.

(14) In (13) above, the phenol antioxidant IA may include at least one selected from the group consisting of (a) a phenol antioxidant in which an aromatic ring has one or two or more phenolic hydroxy group and at least one selected from the group consisting of an alkyl group having 1 to 4 carbon atoms and an alkoxy group having 1 to 4 carbon atoms, (b) a phenol antioxidant in which an aromatic ring has one or two or more phenolic hydroxy group and a hydrogen atom is linked to at least one of carbon atoms adjacent to a carbon atom having the phenolic hydroxy group, and (c) a phenol antioxidant in which an aromatic ring has one or two or more phenolic hydroxy group and have no substituents.

(15) In any one of (1) to (14) above, the first antioxidant may at least include a phenol antioxidant Ia having two or more phenolic hydroxy groups.

(16) In any one of (1) to (15) above, the first antioxidant may at least include a hindered phenol compound.

The following describes an electrolytic capacitor and a liquid component for an electrolytic capacitor according to the present disclosure that include (1) to (16) above. At least one of (1) to (16) above and at least one of elements described below may be combined as long as no technical contradiction arises.

(Antioxidant Component)

In this specification, the term "antioxidant component" refers to a component that acts to inactivate radicals produced by the involvement of oxygen. The antioxidant component encompasses not only a component commonly referred to as an antioxidant but also components referred to as an anti-deterioration agent, an anti-aging agent, a radical chain inhibitor, a peroxide decomposer, a chain initiation inhibitor, a light stabilizer, a heat stabilizer (or a heat-resistant stabilizer), a metal deactivator, an ultraviolet absorber, a weather-resistant stabilizer, and the like.

The antioxidant component includes at least a first antioxidant. When the first antioxidant has a boiling point, the boiling point is 320° C. or higher and may be 350° C. or higher or 400° C. or higher. In this case, the upper limit of the boiling point of the first antioxidant is not particularly limited and may be, for example, 800° C. or lower.

The first antioxidant is less likely to volatilize, evaporate, or sublimate in the electrolytic capacitor. In order to express such properties, the boiling point of the antioxidant is used as a basis in the present disclosure, but the first antioxidant also encompasses an antioxidant that is less likely to volatilize, evaporate, or sublimate similarly to the antioxidant having a boiling point of 320° C. or higher, such as an antioxidant having no boiling point. More specifically, such an antioxidant has no boiling point, is in a liquid form or solid form at 320° C., and is decomposed at 320° C. or higher (e.g., 350° C. or higher, or 400° C. or higher). The antioxidant component may include the first antioxidant and a second antioxidant other than the first antioxidant. The second antioxidant has a boiling point of lower than 320° C.

Each of the antioxidants includes, for example, at least one selected from the group consisting of a hydroxy group, a nitrogen atom, an oxygen atom, a sulfur atom, and a phosphorus atom. Examples of such antioxidants include phenol antioxidants, amine antioxidants, phosphorus antioxidants, sulfur antioxidants, benzimidazole antioxidants, carotenoid compounds, water-soluble vitamins (e.g., vitamin B or derivatives thereof, and vitamin C or derivatives thereof), glutathione, sesamine, melatonin, and flavonoid compounds. The flavonoid compound also encompasses a glycoside, a prenylated flavonoid, an O-methoxyflavonoid, and the like. It is preferable that the first antioxidant (or the antioxidant component) does not include vitamin A, vitamin D, vitamin K, and derivatives thereof (specifically, the amounts thereof are smaller than or equal to the minimum detectable amount) from the viewpoint that many of them have a relatively low boiling point and have a low thermal stability.

The phenol antioxidant has a phenolic hydroxy group. Out of the first antioxidants, the phenol antioxidant having a phenolic hydroxy group may be referred to as a "phenol antioxidant IA". Examples of the phenol antioxidant IA include monophenol antioxidants and polyphenol antioxidants.

The polyphenol antioxidant includes, for example, a compound having a ring structure that includes an aromatic ring having a phenolic hydroxy group. Such a compound includes two or more phenolic hydroxy groups per molecule. Such a compound also encompasses, for example, a compound having a structure in which two or more ring structures that each include an aromatic ring having a phenolic hydroxy group are linked via a single bond or a linking group (first linking group). One of the aromatic rings in the compound may have one phenolic hydroxy group or two or more phenolic hydroxy groups. The upper limit of the number of phenolic hydroxy groups per aromatic ring can be selected according to the size of the aromatic ring and is, for example, five or less, and may be four or less, three or less, or two or less. The upper limit of the number of phenolic hydroxy groups per molecule can be selected according to the size of the molecule and is, for example, 20 or less, and may be 14 or less, 10 or less, or 6 or less.

In the compound having a ring structure that includes an aromatic ring having a phenolic hydroxy group, the ring structure may be an aromatic ring, or a condensed ring formed by an aromatic ring and a non-aromatic ring. Each of the aromatic ring and the non-aromatic ring may be a hydrocarbon ring or a hetero ring. The non-aromatic ring may be a bridged ring. Examples of the aromatic ring include aromatic hydrocarbon rings having 6 to 20 (e.g., 6 to 14 or 6 to 10) carbon atoms (e.g., benzene, naphthalene, phenanthrene, and anthracene), and five- to twenty-membered (e.g., six- to fourteen-membered) aromatic hetero rings (e.g., furan, pyrrole, thiophene, imidazole, pyridine, pyrazine, quinoline, indole, benzimidazole, benzotriazole, and purine). Examples of the condensed ring formed by an aromatic ring and a non-aromatic ring include chromene, chromone, chroman, coumarin, 4H-chromen-4-one, and carbazole. Examples of the non-aromatic ring include alicyclic hydrocarbon rings having 5 to 14 (e.g., 5 to 10) carbon atoms (e.g., cyclopentane, cyclohexane, and cyclooctane), bridged cyclic hydrocarbon rings having 6 to 20 (e.g., 6 to 14) carbon atoms (e.g., norbomane, norbornene, and dicyclopentadiene), and five- to twenty-membered (e.g., six- to fourteen-membered) non-aromatic hetero rings (e.g., tetrahydrofuran, dioxolane, dioxane, pyrrolidine, piperidine, morpholine, and thiazine).

In this specification, the hetero ring is, for example, a ring structure that includes at least one hetero atom as a constituent atom of the ring. The hetero atom is, for example, at least one selected from the group consisting of an oxygen atom, a nitrogen atom, and a sulfur atom.

Examples of the first linking group include chain-like polyvalent groups (e.g., polyvalent groups corresponding to aliphatic hydrocarbons such as alkanes and alkenes), polyvalent groups that include an aromatic ring, polyvalent groups that include a non-aromatic ring, and polyvalent groups that include at least one selected from the group consisting of an ether bond (—O—), a thioether bond (—S—), a carbonyl group (—C(═O)—), a carbonyloxy bond (—C(═O)—O—), a nitrogen atom (—N<), an imino group (—NH—), and an amide bond (—C(═O)—NH—, —C(═O)—N<). The chain-like linking group may be a linear-chain linking group or a branched-chain linking group. Examples of the polyvalent group include divalent groups, trivalent groups, and tetravalent groups.

The aromatic ring in the first linking group may be selected from the aromatic rings shown as the examples of the ring structures described above. The non-aromatic ring in the first linking group may be selected from the non-aromatic rings shown as the examples of the ring structures described above. Examples of the polyvalent group that includes an aromatic ring include aromatic polyvalent groups (e.g., a phenylene group and a naphthylene group) and Ar(—$R^{1a}$-)m groups. Ar represents a ring structure that includes an aromatic ring, m is the number of —$R^{1a}$-groups of Ar and represents an integer of 2 or more, and $R^{1a}$ represents an alkylene group. Examples of the polyvalent group that includes a non-aromatic ring include polyvalent groups corresponding to non-aromatic rings (e.g., a cyclohexanediyl group and a dicyclopentanediyl group) and Cy(—$R^{1b}$—)n groups. Cy represents a non-aromatic ring, n is the number of —$R^{1b}$— groups of Cy and represents an integer of 2 or more, and $R^{1b}$ represents an alkylene group. Examples of the polyvalent group that includes at least two selected from the above-described groups include-$R^{1c}$—O—, >$R^{1c}$—O—, —$R^{1c}$—O—$R^{1d}$—, —$R^{1c}$—S—$R^{1d}$—, —$R^{2a}$—C(═O)—O—, —$R^{2a}$—C(═O)—O—$R^{1e}$—, (—$R^{1f}$—C(═O)—O—$R^{1e}$)$_2$—S, (—$R^{1f}$—C(═O)—O)$_2$—$R^{1g}$, (—$R^{1f}$—C(═O)—O—$R^{1e}$—O)$_2$—$R^{1g}$, (—$R^{1f}$—C(═O)—O—$R^{1e}$—NH)$_2$—$R^{1g}$, —$R^{1h}$—C(═O)—NH—$R^{1i}$—, —$R^{1h}$—C(═O)—N(—$R^{1i}$-)$_2$, and (—$R^{1h}$—C(═O)—NH)$_2$—$R^{1i}$. $R^{1c}$ to $R^{1i}$ each represent an alkylene group, and $R^{2a}$ represents a divalent hydrocarbon group (e.g., a divalent aromatic hydrocarbon group such as a phenylene group, a divalent alicyclic hydrocarbon group such as a cyclohexanediyl group, or an alkylene group). However, the first linking group is not limited to only these groups.

The number of carbon atoms in the polyvalent groups corresponding to aliphatic hydrocarbons and the number of carbon atoms in the alkylene groups represented by $R^{1a}$ to $R^{1i}$ and $R^{2a}$ are, for example, 1 to 10 and may be 1 to 6 or 1 to 4. The number of carbon atoms in the polyvalent group corresponding to an alkene out of aliphatic hydrocarbons is, for example, 2 to 10 and may be 2 to 6 or 2 to 4. m and n are, for example, 4 or less and may be 3 or less. The aliphatic hydrocarbons and the alkylene groups may be in the linear-chain form or the branched-chain form. In the Ar(—$R^{1a}$-)m groups, at least two of the $R^{1a}$ groups may be the same, and all of them may be different. In the Cy(—$R^{1b}$—) n groups, at least two of the $R^{1b}$ groups may be the same, and all of them may be different. The Ar(—$R^{1a}$—) m group is, for example, a polyvalent group in which two or three methylene groups are linked to a benzene ring. Examples of the Cy(—$R^{1b}$-)n group include cyclohexanedimethylene, and a trivalent group in which methylene groups are linked to three nitrogen atoms in isocyanuric acid.

The compound having a ring structure that includes an aromatic ring having a phenolic hydroxy group may also include a substituent (first substituent) other than a phenolic hydroxy group. The first substituent may be included in at least one of the ring structure that includes an aromatic ring, and the first linking group. Examples of the first substituent include hydrocarbon groups, monovalent groups corresponding to hetero rings, a hydroxy group, an oxo group (═O), $R^{2b}$—O— groups, a carboxy group, $R^{2b}$—O—C(═O)— groups, and saturated or unsaturated acyloxy groups. $R^{2b}$ represents a monovalent group corresponding to a hydrocarbon group or a hetero ring. When the compound has a hydroxy group as the first substituent, the position of this hydroxy group is commonly at least one of a position on the first linking group and a position on the non-aromatic ring included in the ring structure. Examples of the hydrocarbon group for the first substituent or $R^{2b}$ include aromatic hydrocarbon groups (e.g., aryl groups having 6 to 14 carbon atoms, such as a phenyl group), alicyclic hydrocarbon groups (e.g., cycloalkyl groups having 5 to 10 carbon atoms (e.g., a cyclohexyl group), and bridged cyclic hydrocarbon groups having 6 to 20 carbon atoms (e.g., a norbornyl group)), and aliphatic hydrocarbon groups (e.g., alkyl groups and alkenyl groups). The aliphatic hydrocarbon group may be in the linear-chain form or the branched-chain form. The number of carbon atoms in the alkyl group is, for example, 1 to 20 and may be 1 to 16, 1 to 10, 1 to 6, 1 to 4, or 1 to 3. Specific examples of the alkyl group include a methyl, an ethyl, an n-propyl, an isopropyl, an n-butyl, an isobutyl, a sec-butyl, a tert-butyl, a hexyl, a 2-ethylhexyl, a decyl, a tetradecyl, and an octadecyl. The number of carbon atoms in the alkenyl group is, for example, 2 to 10 and may be 2 to 6 or 2 to 4. Specific examples of the alkenyl group include a vinyl and an allyl. The monovalent group corresponding to a hetero ring may be five- to fourteen-membered or five- to ten-membered. The first substituent, or the hydrocarbon group or the monovalent group corresponding to a hetero ring for $R^{2b}$ may further have a substituent (second substituent). Examples of the second substituent include a hydroxy group, an amino group, alkylamino groups, dialkylamino groups, a carboxy group, and alkoxycarbonyl groups. The number of carbon atoms in the alkyl of the alkylamino group or the dialkylamino group is, for example, 1 to 20 and may be 1 to 16, 1 to 10, 1 to 6, 1 to 4, or 1 to 3. The number of carbon atoms in the alkoxycarbonyl group for the second substituent is, for example, 2 to 20 and may be 2 to 17, 2 to 15, 2 to 11, 2 to 7, 2 to 5, or 2 to 4. When the first substituent is the hydrocarbon ring group or the monovalent group corresponding to a hetero ring, the second substituent may be an alkyl group (e.g., an alkyl group having 1 to 10 (e.g., 1 to 6 or 1 to 4, and preferably 1 to 3) carbon atoms). The number of first substituents in the compound can be selected according to the size of the compound and may be 1 to 14, 1 to 10, or 1 to 6. The number of second substituents may be 1 to 10 or 1 to 6. When the compound has two or more first substituents, at least two first substituents may be the same, and all of them may be different. When the compound has two or more second substituents, at least two second substituents may be the same, and all of them may be different.

In the phenol antioxidant IA, the types and the number of substituents in the aromatic ring having a phenolic hydroxy group contribute to the solubility of the phenol antioxidant IA in the liquid component, the oxidation stability thereof, and the like. For example, in the phenol antioxidant IA, the aromatic ring may have at least one substituent selected from at least the group consisting of alkyl groups and alkoxy groups out of the above-described first substituents in addition to at least one phenolic hydroxy group. When the alkyl group and the alkoxy group have 1 to 4 (preferably 1 to 3) carbon atoms, the solubility in the liquid component is likely to improve. Specific examples of such an alkyl group include a methyl group, an ethyl group, an n-propyl group, an isopropyl group, and a tert-butyl group. Specific examples of the alkoxy group include a methoxy group, an ethoxy group, an n-propoxy group, an isopropoxy group, and a tert-butoxy group. The smaller the number of alkyl groups and alkoxy groups per aromatic ring is, the more likely it is that the solubility in the liquid component improves, and it is also preferable that the aromatic ring has no alkyl groups and no alkoxy groups. On the other hand, the larger the number of alkyl groups and alkoxy groups per aromatic ring is, the more likely it is that the stability of the antioxidant improves. In the phenol antioxidant IA, the aromatic ring may have no substituents in addition to a phenolic hydroxy group. The larger the number of phenolic hydroxy groups per aromatic ring or the number of hydroxy groups (including a phenolic hydroxy group) in the antioxidant is, the more likely it is that the solubility in the liquid component improves. When a hydrogen atom is linked to at least one of the carbon atoms adjacent to the carbon atom having a phenolic hydroxy group in the aromatic ring, the solubility in the liquid component is likely to improve. Accordingly, when the liquid component in which the first antioxidant is dissolved is used in the electrolytic capacitor, it is preferable to select the phenol antioxidant IA in view of these circumstances. Such a phenol antioxidant IA is, for example, at least one selected from the group consisting of (a) phenol antioxidants in which an aromatic ring has at least one (one or two or more) phenolic hydroxy group and at least one selected from the group consisting of alkyl groups having 1 to 4 (preferably 1 to 3) carbon atoms and alkoxy groups having 1 to 4 (preferably 1 to 3) carbon atoms, (b) phenol antioxidants in which an aromatic ring has at least one (one or two or more) phenolic hydroxy group and a hydrogen atom is linked to at least one of the carbon atoms adjacent to the carbon atom having the phenolic hydroxy group, and (c) phenol antioxidants in which an aromatic ring has at least one (one or two or more) phenolic hydroxy group and does not have other substituents. These antioxidants may have two or more phenolic hydroxy groups. Also, these antioxidants may have two or more hydroxy groups including a phenolic hydroxy group.

Examples of the amine antioxidant include aromatic amine antioxidants, amine-ketone antioxidants, and hindered amine compounds. The phosphorus antioxidant is, for example, a phosphite compound. Examples of the sulfur antioxidant include sulfur-containing acids, esters or salts of sulfur-containing acids, isothiocyanate compounds, and thioether antioxidants. The carotenoid compound is, for example, at least one selected from the group consisting of lutein, zeaxanthin, canthaxanthin, fucoxanthin, astaxanthin, antheraxanthin, and violaxanthin. Vitamin B or a derivative thereof is vitamin B2 or a derivative thereof, and is, for example, at least one selected from the group consisting of rivoflavin and esters or salts thereof. Vitamin C or a derivative thereof is, for example, at least one selected from the group consisting of ascorbic acid (e.g., L-ascorbic acid), erythorbic acid, and esters (e.g., L-ascorbic acid palmitic acid ester) or salts thereof. In addition, at least one selected from the group consisting of 1,8-cineol, α-pinene, camphor, and borneol may be used as a rosemary-extract antioxidant. The first antioxidant includes a flavonoid compound having no phenolic hydroxy group. Such a flavonoid compound is, for example, at least one selected from the group consisting of flavones (e.g., zapotin, cerrosillin, sinensetin, tangeretin, and nobiletin) and flavonols (e.g., 3-hydroxyflavone and natsudaidain).

It is also preferable that the first antioxidant (more specifically, the phenol antioxidant IA) includes a hindered phenol compound. The hindered phenol compound is a phenol compound that has a hindered group in the aromatic ring. The hindered group includes a tertiary carbon atom or quaternary carbon atom (particularly a quaternary carbon atom) linked to the aromatic ring. Such a hindered group is, for example, a hindered alkyl group. Examples of the hindered alkyl group include an isopropyl group, a sec-butyl group, a tert-butyl group, a tert-pentyl group (tert-amyl group), an α-methylbenzyl group, and an α,α-dimethylbenzyl group. In particular, a sec-butyl group, a tert-butyl group, a tert-pentyl group, and an α,α-dimethylbenzyl group are preferable. The phenol compound may have one or two or more of these hindered groups. When the phenol compound has two or more hindered groups, at least two of them may be the same, and all of them may be different.

Examples of the monophenol antioxidant out of the phenol antioxidants IA include aryl ester compounds having a phenolic hydroxy group, Trolox, normelatonin, ferulic acid, and shogaol. Examples of the aryl ester compound having a phenolic hydroxy group include compounds in which the aryl moiety has a phenolic hydroxy group and optionally at least one selected from the group consisting of alkyl groups and alkoxy groups, such as octadecyl 3-(3,5-di-tert-butyl-4-hydroxyphenyl) propionate. When the aryl ester compound having a phenolic hydroxy group is dissolved in the liquid component before use, it is preferable to use a compound having an alkyl group or an alkoxy group having 1 to 4 (preferably 1 to 3) carbon atoms in the aryl moiety, a compound having no alkyl group and no alkoxy group in the aryl moiety, or a compound having two or more hydroxy groups including a phenolic hydroxy group.

Examples of the compound having a structure in which two or more ring structures that each includes an aromatic ring having a phenolic hydroxy group are linked via a single bond or the first linking group, out of the polyphenol antioxidants used as the first antioxidant, include products obtained through butylation reaction between p-cresol and dicyclopentadiene, Anoxomers, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 4,4'-thiobis(3-methyl-6-tert-butylphenol), 2,2'-methylenebis(6-cyclohexyl-p-cresol), 2,4,6-tris(2,4-dihydroxyphenyl)-1,3,5-triazine, 1,3,5-tris(3,5-di-tert-butyl-4-hydroxybenzyl)-1,3,5-triazine-2,4,6 (1H,3H,5H)-trione, 4,4',4"-(1-methylpropanyl-3-ylidene)tris(m-cresol), 4,4',4"-(1-methylpropanyl-3-ylidene)tris(6-tert-butyl-m-cresol), 6,6'-di-tert-butyl-4,4'-butylidenedi-m-cresol, pentaerythritoltetrakis [3-(3,5-di-tert-butyl-4-hydroxyphenyl) propionate], 3,9-bis {2-[3-(3-tert-butyl-4-hydroxy-5-methylphenyl) propionyloxy]-1,1-dimethylethyl}-2,4,8,10-tetraoxaspiro [5.5]undecane, 1,3,5-tris(3,5-di-tert-butyl-4-hydroxyphenylmethyl)-2,4,6-trimethylbenzene, thiodiethylenebis [3-(3,5-di-tert-butyl-4-hydroxyphenyl) propionate], N,N'-hexane-1,6-diylbis [3-(3,5-di-tert-butyl-4-hydroxyphenylpropion amide)], ethylenebis(oxyethylene) bis-[3-(5-tert-butyl-4-hydroxy-m-tolyl) propionate], ethylenebis-[3,3-bis(3-tert-butyl-4-hydroxyphenyl)butylate], hexamethylenebis [3-(3,5-di-tert-butyl-4-hydroxyphenyl) propionate], and [oxalylbis(azanediyl)]bis(ethane-2,1-diyl) bis [3-(3,5-di-tert-butyl-4-hydroxyphenyl) propionate].

Other examples of the polyphenol antioxidant used as the first antioxidant include hydroxytyrosol, pinosembrin, pinobanksin, protocatechuic acid, curcumin, rosemary-extract antioxidants (e.g., carnosol and caffeic acid), 2,5-di-tert-butylhydroquinone, 2,5-di-tert-amylhydroquinone, gallic acid, propyl gallate, derivatives of polyhydroxycinnamic acid (e.g., chlorogenic acid and caffeine acid), dopamine, adrenaline, noradrenaline, carnosic acid, and ursolic acid.

A flavonoid compound (including a glycoside) having a phenolic hydroxy group, an isoflavonoid compound (including a glycoside) having a phenolic hydroxy group, a neoflavonoid compound having a phenolic hydroxy group, a biflavonoid compound having a phenolic hydroxy group, an aurone compound having a phenolic hydroxy group, or the like may be used as the phenol antioxidant. Examples of such a compound include flavones (e.g., primuletin, chrysin, tectochrysin, primetin, apigenin, acacetin, genkwanin, echioidinin, baicalein, oroxylon, negletein, norwogonin, geraldone, tithonine, luteolin, 6-hydroxyluteolin, chrysoeriol, diosmetin, pilloin, veltin, norartocarpetin, artocarbetin, scutellarein, hispidulin, solbifolin, pectolinarigenin, cirsimaritin, mikanin, isoscutellarein, zapotinin, alnetin, tricetin, tricin, corymbosin, nepetin, pedalitin, nodifloretin, cirsiliol, eupatilin, cirsilineol, eupatorin, hypolaetin, onopordin, wightin, nevadensin, xanthomicrol, serpyllin, sudachitin, acerosin, hymenoxin, gardenin D, and scaposin), isoflavones having a phenolic hydroxy group (e.g., genistein and daidzein), flavanes having a phenolic hydroxy group (e.g., catechin compounds (e.g., epicatechin, catechin, epigallocatechin, gallocatechin, epicatechin gallate, catechin gallate, epigallocatechin gallate, gallocatechin gallate, and procyanidin (dimer, trimer, and the like)), isoflavanes having a phenolic hydroxy group (e.g., isoflavandiols such as equol), flavonols having a phenolic hydroxy group (e.g., azaleatin, fisetin, galangin, gossypetin, kaempferide, kaempferol, isorhamnetin, morin, myricetin, pachypodol, quercetin, rhamnazin, rhamnetin, tamarixetin, and isorhamnetin), flavonol glycosides having a phenolic hydroxy group (e.g., astragalin, azalein, hyperoside, isoquercetin, kaempferitrin, myricitrin, quercitrin, robinin, rutin, spiraeoside, xanthorhamnin, amurensin, icariin, and troxerutin), flavanols having a phenolic hydroxy group or glycosides thereof (e.g., theaflavin), flavanones having a phenolic hydroxy group (e.g., butin, eriodictyol, hesperetin, homoeriodictyol, isosakuranetin, naringenin, pinocembrin, sakuranetin, and sterubin), flavanone glycosides having a phenolic hydroxy group (e.g., hesperidin, naringin, poncirin, and sakuranin), and anthocyanidin compounds having a phenolic hydroxy group or glycosides thereof (e.g., anthocyanidin compounds such as pelargonidin, cyanidin, delphinidin, aurantinidin, luteolinidin, peonidin, malvidin, petunidin, europinidin, and rosinidin, or glycosides corresponding to these anthocyanidine compounds (anthocyanin compounds)). Many of these compounds have a structure in which two or more ring structures that each include an aromatic ring having a phenolic hydroxy group are linked via a single bond or the first linking group.

A rosemary-extract antioxidant (e.g., rosmarinic acid and luteolin), gnetin C, chebulagic acid, resveratrol, or the like may be used as the phenol antioxidant IA.

Out of these compounds, a polyphenol compound that may have at least one selected from the group consisting of alkyl groups and alkoxy groups in the aromatic ring (aryl moiety) having a phenolic hydroxy group may be used. When such a polyphenol compound is dissolved in the liquid component before use, it is preferable to use a compound having an alkyl group or an alkoxy group having 1 to 4 (preferably 1 to 3) carbon atoms in the aryl moiety, a compound having no alkyl group and no alkoxy group, or a compound having two or more hydroxy groups including a phenolic hydroxy group. Various compounds having a tert-butyl group are shown as examples in the description above, but, for example, compounds obtained by substituting the tert-butyl group in these compounds with an alkyl group having 1 to 3 carbon atoms (particularly a methyl group, an ethyl group, or the like) or an alkoxy group having 1 to 3 carbon atoms (particularly a methoxy group, an ethoxy group, or the like), compounds without a tert-butyl group, or compounds that further have, in these compounds, two or more phenolic hydroxy groups are suitable particularly when being dissolved in the liquid component before use.

One of these phenol antioxidants IA may be used alone, or two or more of them may be used in combination.

Examples of the aromatic amine antioxidant out of the amine antioxidants serving as the first antioxidant include aromatic amine compounds having a plurality of aromatic rings. The plurality of aromatic rings may be linked together via —NH— or a linking group (second linking group). The aromatic rings can be selected from those described in the description of the phenol antioxidant and are preferably aromatic hydrocarbon rings (e.g., aromatic hydrocarbon rings having 6 to 14 carbon atoms, such as benzene and naphthalene). The second linking group can be selected from the examples of the first linking group and is preferably a polyvalent group corresponding to an aliphatic hydrocarbon, an alkylene group, or the like. The number of carbon atoms in the second linking group is, for example, 1 to 10 and may be 1 to 6 or 1 to 4. A group other than an aromatic ring (e.g., a group corresponding to a non-aromatic ring or an aliphatic hydrocarbon group) may be linked to an amino group that is linked to the aromatic ring included in the aromatic amine compound. Examples of such a group include alicyclic hydrocarbon groups and aliphatic hydrocarbon groups described as the examples of the first substituent as well as organic sulfonyl groups (—$SO_2$—$R^3$). Examples of $R^3$ include aromatic hydrocarbon groups, alicyclic hydrocarbon groups, and aliphatic hydrocarbon groups described as the examples of the first substituent. The aromatic amine compound may have one or two or more substituents (third substituents). Examples of the third substituents include the groups described as the examples of the first substituent other than hydrocarbon groups. When the aromatic amine compound has two or more third substituents, at least two of them may be the same, and all of them may be different. The aromatic amine compound may have an aryl moiety having a phenolic hydroxy group (e.g., a phenol moiety or a hindered phenol moiety).

Examples of the aromatic amine compound include N-phenyl-1-naphthylamine, di(alkylphenyl)amines (e.g., 4,4'-dioctylphenylamine), 4,4'-bis(α,α-dimethylbenzyl)diphenylamine, p-(p-toluenesulfonylamide)diphenylamine, N,N'-di-2-naphthyl-p-phenylenediamine, N-phenyl-N'-isopropyl-p-phenylenediamine, N-phenyl-N'-isopropyl-p-phenylenediamine, N-phenyl-N'-(1,3-dimethylbutyl)-p-phenylenediamine, and N-phenyl-N'-(3-methacryloyloxy-2-hydroxypropyl)-p-phenylenediamine. Specific examples of the amine-ketone antioxidant include a 2,2,4-trimethyl-1,2-dihydroquinoline polymer (i.e., a reaction product of diphenylamine and acetone) and acetylcysteine. Examples of the hindered amine compound include compounds that have a piperidyl group having a plurality of alkyl groups (alkyl groups having 1 to 3 carbon atoms, such as a methyl group), such as tetrakis(1,2,2,6,6-pentamethyl-4-piperidyl) butane-1,2,3,4-tetracarboxylate, tetrakis(2,2,6,6-tetramethyl-4-piperidyl) butane-1,2,3,4-tetracarboxylate, tetramethyl esters of 1,2,3,4-butanetetracarboxylic acid and a reaction product of 1,2,2,6,6-pentamethyl-4-piperidinol and β,β,β',β'-tetramethyl-2,4,8,10-tetraoxaspiro [5.5]undecane-3,9-diethanol, tetramethyl esters of 1,2,3,4-butanetetracarboxylic acid and a reaction product of 2,2,6,6-tetramethyl-4-piperidinol and β,β,β',β'-tetramethyl-2,4,8,10-tetraoxaspiro [5.5]undecane-3,9-diethanol, bis(2,2,6,6,-tetramethyl-4-piperidyl) sebacate, bis(1,2,2,6,6,-pentamethyl-4-piperidyl) sebacate, N,N'-bis(2,2,6,6-tetramethylpiperidin-4-yl) hexane-1,6-diamine, $N^1$,$N^3$-bis(2,2,6,6-tetramethylpiperidin-4-yl) isophthalamide, and piperidyl ester compounds that have an aryl moiety having a phenolic hydroxy group.

Examples of the piperidyl ester compound that has an aryl moiety having a phenolic hydroxy group include piperidyl ester compounds that may have, in the aryl moiety, at least one selected from the group consisting of alkyl groups and alkoxy groups in addition to a phenolic hydroxy group (e.g., bis(1,2,2,6,6-pentamethyl-4-piperidinyl)-2-butyl-2-(4-hydroxy-3,5-di-tert-butylbenzyl) propanediate, and bis(1,2,2,6,6-pentamethyl-4-piperidyl)butyl(3,5-di-tert-butyl-4-hydroxybenzyl) malonate). When the piperidyl ester compound that has an aryl moiety having a phenolic hydroxy group is dissolved in the liquid component before use, it is preferable to use a compound having an alkyl group or an alkoxy group having 1 to 4 (preferably 1 to 3) carbon atoms in the aryl moiety, a compound having no alkyl group and no alkoxy group, or a compound having two or more hydroxy groups including a phenolic hydroxy group. Compounds having a tert-butyl group are shown as the piperidyl ester compounds that may have, in the aryl moiety, at least one selected from the group consisting of alkyl groups and alkoxy groups in addition to a phenolic hydroxy group in the description above, but, for example, compounds obtained by substituting the tert-butyl group with an alkyl group having 1 to 3 carbon atoms (particularly a methyl group, an ethyl group, or the like) or an alkoxy group having 1 to 3 carbon atoms (particularly a methoxy group, an ethoxy group, or the like) in these compounds, these compounds without a tert-butyl group, or these compounds that further have two or more phenolic hydroxy groups are suitable particularly when being dissolved in the liquid component before use.

One of these amine antioxidants serving as the first antioxidant may be used alone, or two or more of them may be used in combination.

Specific examples of the phosphite compound used as the phosphorus antioxidant serving as the first antioxidant include aromatic phosphite compounds (e.g., an aryl phosphite compound and an arylene bisphosphite compound), aliphatic phosphite compounds (e.g., an alkyl phosphite compound (e.g., trialkyl phosphite compound such as trioctyl phosphite and tri (2-ethylhexyl)phosphite), and alkenyl phosphite compounds (e.g., a trialkenyl phosphite compound such as trioleyl phosphite)), and cyclic phosphite compounds. Examples of the aryl phosphite compound include aryl phosphite compounds that may have, in the aryl moiety, at least one selected from the group consisting of alkyl groups, alkoxy groups, and a hydroxy group (phenolic hydroxy group) (e.g., tris(nonylphenyl) phosphite, tris(2,4-di-tert-butylphenyl) phosphite, tri-o-tolyl phosphite, and triphenyl phosphite). Examples of the arylene bisphosphite compound include arylene bisphosphite compounds that may have, in the aryl moiety, at least one selected from the group consisting of alkyl groups, alkoxy groups, and a hydroxy group (phenolic hydroxy group) (e.g., tetra-$C_{12-15}$ alkyl(propane-2,2-diylbis(4,1-phenylene))bis(phosphite)). Examples of the cyclic phosphite compounds include bisarylene-alkyl phosphite compounds, and aryloxy-2,4,8,10-tetraoxa-3,9-diphosphaspiro [5.5]undecane compounds. Examples of the bisarylene-alkyl phosphite compound out of the cyclic phosphite compounds include bisarylene-alkyl phosphite compounds that may have, in the bisarylene moiety, at least one selected from the group consisting of alkyl groups, alkoxy groups, and a hydroxy group (phenolic hydroxy group) (e.g., 2,2'-methylenebis(4,6-di-tert-butylphenyl) 2-ethylhexyl phosphite). Examples of the aryloxy-2,4,8,10-tetraoxa-3,9-diphosphaspiro [5.5]undecane compound include compounds that may have, in the aryl moiety of the aryloxy group, at least one selected from the group consisting of alkyl groups, alkoxy groups, and a hydroxy group (phenolic hydroxy group) (e.g., 3,9-bis(2,4-di-tert-butylphenoxy)-2,4,8,10-tetraoxa-3,9-diphosphaspiro [5.5]undecane and 3,9-bis(2,6-di-tert-butyl-4-methylphenoxy)-2,4,8,10-tetraoxa-3,9-diphosphaspiro [5.5]undecane). When these compounds are dissolved in the liquid component before use, it is preferable to use a compound having an alkyl group or an alkoxy group having 1 to 4 (preferably 1 to 3) carbon atoms in the aryl moiety or the arylene moiety, a compound having no alkyl group and no alkoxy group, or a compound having two or more hydroxy groups including a phenolic hydroxy group. A plurality of compounds having a tert-butyl group are shown as examples in the description above, but, for example, compounds obtained by substituting the tert-butyl group, in these compounds, with an alkyl group having 1 to 3 carbon atoms (particularly a methyl group, an ethyl group, or the like) or an alkoxy group having 1 to 3 carbon atoms (particularly a methoxy group, an ethoxy group, or the like), compounds without a tert-butyl group, or compounds that further have, in these compounds, two or more phenolic hydroxy groups are suitable particularly when being dissolved in the liquid component before use. One of the phosphorus antioxidants serving as the first antioxidant may be used alone, or two or more of them may be used in combination.

An example of the sulfur-containing acid out of the sulfur antioxidants serving as the first antioxidant is laurylthiopropionic acid. Examples of the ester or salt of a sulfur-containing acid include dilauryl thiopropionate, sulfurous acid, sulfites (e.g., a sodium salt, a potassium salt, a calcium salt, an ammonium salt, and sodium hydrogen sulfite), and pyrosulfites. Examples of the thioether antioxidant include 2,2-bis {[3-(dodecylthio)-1-oxopropoxy]methyl}propane-1,3-diylbis [3-(dodecylthio) propionate] and di(tridecyl) 3,3'-thiodipropionate. One of the sulfur antioxidants serving as the first antioxidant may be used alone, or two or more of them may be used in combination.

Examples of the benzimidazole antioxidant out of the first antioxidants include imidazole dipeptides (e.g., carnosine, anserine, and balenine). One of the benzimidazole antioxidants serving as the first antioxidant may be used alone, or two or more of them may be used in combination.

At least one selected from the group consisting of the phenol antioxidants and the phosphorus antioxidants out of the first antioxidants may be used. Even when peroxy radicals are produced due to oxygen in the capacitor element, the phenol antioxidant and the amine antioxidant out of the first antioxidants can react with the peroxy radicals and effectively suppress a chain of radical reactions. Accordingly, at least one antioxidant selected from the group consisting of the phenol antioxidants and the amine antioxidants may be used. In particular, the phenol antioxidant is less likely to cause unexpected side reactions, and many types thereof are present and are readily available, compared with the amine antioxidant. Accordingly, it is preferable to use at least the phenol antioxidant IA. The phenol antioxidant IA and another first antioxidant (specifically, at least one first antioxidant selected from the group consisting of the amine antioxidants, the phosphorus antioxidants, the sulfur antioxidants, the benzimidazole antioxidants, and vitamin C or derivatives thereof) may be used in combination. The effects of the phenol antioxidant IA can be improved by using at least one selected from the group consisting of the phosphorus antioxidants, the sulfur antioxidants, and the benzimidazole antioxidants as the other first antioxidant. In particular, a phenol antioxidant (also referred to as a "phenol antioxidant Ia") having two or more phenolic hydroxy groups out of the phenol antioxidants IA has high reactivity with peroxy radicals. Accordingly, it is more preferable that the first antioxidant includes at least the phenol antioxidant Ia. When the first antioxidant includes at least a hindered phenol compound, higher effects can be obtained. At least a portion of the phenol antioxidant Ia may be constituted of a hindered phenol compound.

Examples of the monophenol antioxidant out of the second antioxidants include 2,6-tert-butyl-4-methylphenol, butylhydroxyanisole, sesamol, and α-tocopherol. Examples of the polyphenol antioxidant include catechol, hydroquinone, resorcinol, urushiol, and pyrogallol. An example of the amine antioxidant is 6-ethoxy-1,2-dihydro-2,2,4-trimethylquinoline. Examples of the benzimidazole antioxidant include 2-mercaptobenzimidazole and 2-mercaptomethylbenzimidazole. Examples of the phosphorus antioxidant include tri-p-tolyl phosphite and trihexyl phosphite. The second antioxidant also encompasses citric acid and the like.

In the present disclosure, even when the electrolytic capacitor is exposed to high temperatures, using the first antioxidant makes it possible to suppress deterioration of the conductive polymer and the sealing body, and it is possible to ensure the high heat resistance property of the electrolytic capacitor. Accordingly, the larger the ratio of the first antioxidant in the antioxidant component, the more preferable it is, and the ratio is, for example, 10 mass % or more and may be 50 mass % or more or 80 mass % or more. The ratio of the first antioxidant in the antioxidant component is 100 mass % or less. The antioxidant component may be constituted of only the first antioxidant.

The mass ratio of the first antioxidant to the conductive polymer (=first antioxidant/conductive polymer) is, for example, 0.01 or more and 300 or less, and may be 0.05 or more and 100 or less, 0.1 or more and 20 or less, 0.1 or more and 10 or less, 1 or more and 10 or less, or 1.5 or more and 8 or less. When the mass ratio is within such a range, a higher effect of suppressing deterioration of the conductive polymer is likely to be ensured, and it is possible to reduce leakage current and the occurrence of internal short circuit. When the first antioxidant is dissolved in the liquid component before use, the above-mentioned mass ratio may be 0.1 or more and 8 or less, 0.3 or more and 8 or less, or 1 or more and 6 or less.

The conductive polymer may include a conjugated polymer and a dopant. The molar ratio of the first antioxidant to the total monomer units of the conjugated polymer (=first antioxidant/total monomer units) is, for example, 0.1 or more and 200 or less, and may be 0.5 or more and 100 or less (or 50 or less), 1 or more (or 2 or more) and 50 or less, 2 or more (or 3 or more) and 40 or less, or 2 or more and 10 or less. When the first antioxidant is dissolved in the liquid component before use, the above-mentioned molar ratio may be 1 or more and 30 or less, or 2 or more and 25 or less. When the molar ratio is within such a range, the effect of suppressing deterioration of the conjugated polymer is further improved, and it is possible to reduce leakage current and the occurrence of internal short circuit. The ratio of the mole of the first antioxidant to the total mole of the raw material monomers of the conjugated polymer may be used as the above-mentioned molar ratio.

The mass ratio of the first antioxidant to the conjugated polymer (=first antioxidant/conductive polymer) is, for example, 0.1 or more and 200 or less, and may be 0.5 or more and 100 or less, 1 or more (or 2 or more) and 50 or less, 2 or more (or 3 or more) and 40 or less, or 2 or more and 25 or less (or 10 or less). When the first antioxidant is dissolved in the liquid component before use, the above-mentioned mass ratio may be 1 or more and 20 or less, 1 or more and 15 or less, or 3 or more and 15 or less. When the mass ratio is within such a range, the effect of suppressing deterioration of the conjugated polymer is further improved, and it is possible to reduce leakage current and the occurrence of internal short circuit.

The concentration of the first antioxidant in the liquid component is, for example, 0.1 mass % or more and 50 mass % or less and may be 0.1 mass % or more and 20 mass % or less, or 0.5 mass % or more (or 1 mass % or more) and 10 mass % or less. When the concentration of the first antioxidant is within such a range, the effect of suppressing deterioration of the conductive polymer and the sealing body is further improved, and a high effect of restoring the dielectric layer is likely to be ensured, thus making it possible to reduce leakage current and the occurrence of internal short circuit.

The antioxidant present inside the electrolytic capacitor (specifically, in a space closed by the container and the sealing body) is analyzed according to, for example, the following procedure. First, the electrolytic capacitor is disassembled, and if a liquid component is included, all the liquid component is collected, and the mass ($M_0$) is measured. If a component undissolved in the liquid component is present, this undissolved component is also collected and is dried under reduced pressure, and the mass ($M_1$) is measured. The collected liquid component is qualitatively analyzed using high performance liquid chromatography mass spectrometry (HPLC-MS) or gas chromatography mass spectrometry (GC-MS), and thus the antioxidant included in the liquid component is identified. For example, GC-MS is used for an antioxidant having a boiling point of lower than 500° C., and HPLC-MS is used for an antioxidant having a boiling point of 500° C. or higher. A standard curve is formed using the same antioxidant as the identified antioxidant, and the concentration of the antioxidant included in the liquid component is determined. This concentration and the mass $M_0$ are used to determine the mass ($M_2$) of the antioxidant included in a state of being dissolved in the entire liquid component. A sample formed by dissolving, in a solvent, all the dry substance of the component undissolved in the liquid component is qualitatively analyzed using HPLC-MS or GC-MS, and thus the antioxidant is identified. A standard curve is formed using the same antioxidant as the identified antioxidant, the concentration of the antioxidant in the sample is determined, and then this concentration and the mass $M_1$ are used to determine the mass ($M_3$) of the antioxidant undissolved in the liquid component. The sum of the mass $M_2$ and the mass $M_3$ is the mass of the antioxidant present inside the electrolytic capacitor. When the melting point of the identified antioxidant is 320° C. or higher, the antioxidant is considered as the first antioxidant, and the mass of the first antioxidant present inside the electrolytic capacitor is determined similar to the description above. The analysis is performed at least three times, and the average value is determined. The thus determined mass is used to determine the mass ratio of the antioxidant to the conductive polymer, the conjugated polymer, the elastic polymer, or a non-aqueous solvent (e.g., alkylene glycol) in the liquid component. The identification result of the first antioxidant and the mass of the first antioxidant present inside the electrolytic capacitor are used to determine the mole of the first antioxidant present in the electrolytic capacitor. When only the antioxidant component or first antioxidant dissolved in the liquid component is analyzed, the analysis is also performed similar to the description above.

(Liquid Component)

The electrolytic capacitor of the present disclosure may include the liquid component. The liquid component includes a non-aqueous solvent. The non-aqueous solvent includes at least an alcohol solvent. The liquid component may include the above-mentioned antioxidant component in a state of being dissolved or dispersed therein. The present disclosure also encompasses a liquid component for an electrolytic capacitor that includes a non-aqueous solvent and an antioxidant component dissolved in the non-aqueous solvent. In the present disclosure, at least a portion of the first antioxidant may be present in the electrolytic capacitor in a state of being undissolved in the liquid component. When at least a portion of the first antioxidant is dissolved in the liquid component, the first antioxidant is likely to spread throughout the inside of the electrolytic capacitor, radicals produced by the involvement of oxygen are likely to be inactivated near the conductive polymer and the sealing body, and the deterioration suppressing effect is more likely to be obtained.

As for the antioxidant component included in the liquid component, the description of the antioxidant component above can be referred to. The following more specifically describes constituents of the liquid component other than the antioxidant component.

(Non-Aqueous Solvent)

The non-aqueous solvent includes at least an alcohol solvent. The non-aqueous solvent may include an alcohol solvent (first solvent) and another solvent (second solvent). Examples of the second solvent include sulfone compounds, lactone compounds, and carbonate compounds. The liquid component may include one type of non-aqueous solvent or a combination of two or more types of non-aqueous solvents.

The alcohol solvent encompasses a monohydric alcohol and a polyhydric alcohol. The alcohol solvent may include at least a polyhydric alcohol from the viewpoint of making it likely that a high ability to restore the dielectric layer is obtained. Examples of the polyhydric alcohol include a glycol compound, a glycerin compound, and a sugar alcohol compound. The liquid component may include one type of alcohol solvent or a combination of two or more types of alcohol solvents.

From the viewpoint of making it likely that high permeability of the liquid component to the capacitor element is ensured, it is preferable that the alcohol solvent at least includes at least one (which may be referred to as a "first alcohol solvent" hereinafter) selected from the group consisting of alkylene glycols having 2 to 6 carbon atoms (which may be referred to as "first alkylene glycols" hereinafter) and glycerin. However, when the electrolytic capacitor is exposed to high temperatures, the first alcohol solvent is likely to evaporate, and the sealing body is likely to be deteriorated. When the deterioration of the sealing body proceeds, air is likely to enter the electrolytic capacitor, and the oxidative deterioration of the conductive polymer and the oxidative deterioration of the sealing body are more likely to proceed. In the present disclosure, even when the liquid component includes the first alcohol solvent, the presence of the first antioxidant inside the electrolytic capacitor due to, for example, the first antioxidant being included in the liquid component makes it possible to effectively suppress the oxidation deterioration of the conductive polymer and the sealing body and to ensure a high heat resistance property. In addition, when the antioxidant component includes the phenol antioxidant IA, if the liquid component includes an acid component, the phenol antioxidant IA may be inactivated through esterification of the hydroxy group included in the phenol antioxidant IA. The reaction between the alcohol solvent and the acid component is likely to proceed due to the alcohol solvent such as the first alcohol solvent being included in the liquid component, and therefore, even when the antioxidant component includes the phenol antioxidant IA, it is likely that the activity of the phenol antioxidant IA is maintained, and in addition, a high heat resistance property is ensured.

Examples of the first alkylene glycol include ethylene glycol (EG), propylene glycol (PG), trimethylene glycol, and tetramethylene glycol. The number of carbon atoms in the first alkylene glycol may be 2 to 4, or 2 or 3. The non-aqueous solvent may include one type of first alkylene glycol or a combination of two or more types of first alkylene glycols. It is preferable that the non-aqueous solvent includes at least ethylene glycol as the alcohol solvent. The non-aqueous solvent may include ethylene glycol and at least one selected from alkylene glycols having 3 to 6 carbon atoms. The non-aqueous solvent may include at least one selected from the first alkylene glycols (or first alcohol solvents) and at least one selected from other alcohol solvents.

The mass ratio of the first antioxidant (particularly the phenol antioxidant IA) dissolved in the liquid component to the first alkylene glycol (or first alcohol solvent) (=first antioxidant/first alkylene glycol (or first alcohol solvent)) is, for example, 0.005 or more and 2 or less, and may be 0.01 or more and 0.7 or less, or 0.03 or more and 0.5 or less. When the mass ratio is within such a range, it is likely that high activity of the first antioxidant is maintained, and in addition, a high heat resistance property is ensured.

Examples of the glycol compound other than the first alkylene glycol include alkylene glycols having 6 or more carbon atoms (referred to as "second alkylene glycols"), polyalkylene glycols, and alkylene oxide adducts of polyhydric alcohols. Examples of the second alkylene glycol include alkylene glycols having 6 to 10 carbon atoms such as dihydroxyoctane and dihydroxydecane. Examples of the polyalkylene glycol include poly-$C_{2-4}$-alkylene glycols (e.g., diethylene glycol, dipropylene glycol, triethylene glycol, and polyethylene glycol (PEG)). Examples of the alkylene oxide adduct of a polyhydric alcohol include $C_{2-3}$-alkylene oxide adducts (e.g., ethylene oxide adducts) of polyhydric alcohols, and poly-$C_{2-3}$-alkylene oxide adducts (e.g., polyethylene oxide adducts) of polyhydric alcohols are also encompassed. Examples of the polyhydric alcohol to which an alkylene oxide is added include alkylene glycols having 4 or more carbon atoms and trimethylolpropane as well as sugar alcohols (e.g., glycerin, erythritol, mannitol, and pentaerythritol). The number of repetitions of an oxyalkylene unit in the polyalkylene glycol is, for example, 2 or more and 600 or less, and may be 2 or more and 10 or less, or more than 10 and 600 or less (e.g., 100 or more and 600 or less). The number of alkylene oxide units in the alkylene oxide adduct may be 1 or more, and the sum of the number of alkylene oxide units may be 2 or more. The sum of the number of repetitions of the alkylene oxide unit in the alkylene oxide adduct may be 2 or more and 50 or less, or 2 or more and 20 or less.

Examples of the glycerin compound include glycerin and polyglycerins (e.g., diglycerin and triglycerin). The number of repetitions of a glycerin unit in the polyglycerin is, for example, 2 or more and 20 or less, and may be 2 or more and 10 or less. Examples of the sugar alcohol compound include sugar alcohols (e.g., erythritol, mannitol, and pentaerythritol).

The ratio of the alcohol solvent in the non-aqueous solvent is, for example, 5 mass % or more and 100 mass % or less, and may be 10 mass % or more (or 20 mass % or more) and 100 mass % or less, 10 mass % or more and 80 mass % or less (or 50 mass % or less), or 20 mass % or more and 50 mass % or less. The ratio of the first alcohol solvent or first alkylene glycol (particularly ethylene glycol) in the non-aqueous solvent may be within such a range. When the ratio of the alcohol solvent such as the first alcohol solvent or the first alkylene glycol (e.g., ethylene glycol) is within such a range, the first antioxidant is more likely to exhibit its effects, and a higher heat resistance property is likely to be obtained. In particular, when an antioxidant component that includes at least one selected from the group consisting of the phenol antioxidants IA and the phosphorus antioxidants (particularly the phenol antioxidants) is used, it is preferable that the ratio of the alcohol solvent such as the first alcohol solvent or the first alkylene glycol (e.g., ethylene glycol) is within the range above.

Examples of the sulfone compound out of the second solvents include sulfolane (SL), dimethyl sulfoxide, and diethyl sulfoxide. Examples of the lactone compound include γ-butyrolactone (GBL) and γ-valerolactone. Examples of the carbonate compound include dimethyl carbonate, diethyl carbonate, ethylmethyl carbonate, ethylene carbonate, propylene carbonate, and fluoroethylene carbonate. The non-aqueous solvent may include one type of second solvent or a combination of two or more types of second solvents.

Each solvent in the non-aqueous solvent can be qualitatively and quantitatively analyzed through GC-MS analysis using the liquid component. The concentration of the first alkylene glycol (or the first alcohol solvent) in the liquid component is determined, and then this concentration and the entire mass of the liquid component are used to determine the mass of the first alkylene glycol (or the first alcohol solvent) included in the entire liquid component. This mass and the mass of the first antioxidant are used to determine the mass ratio "first antioxidant/first alkylene glycol (or first alcohol solvent)". The GC-MS analysis may be performed under the following conditions.

Apparatus: GCMS-QP2010 (manufactured by Shimadzu Corporation)

Sample Volume: 1 μL

Column: DB-WAX (length: 30 m, inner diameter: 0.25 mm, adsorbent film thickness: 0.25 μm, upper temperature limit: 260° C.)

Heating Flow: Maintained at 50° C. for 1 min→heated to 250° C. at 10° C./min→maintained at 250° C. for 20 min Ion Beam Source Temperature: 200° C.

Interface Temperature: 250° C.

(Solute)

The liquid component may include a solute. Examples of the solute include acid components and base components. It is preferable that the liquid component includes at least an acid component. When the conductive polymer component includes a dopant, the acid component in the liquid component suppresses the de-doping phenomenon of the dopant and stabilizes the conductivity of each polymer component. In addition, even when the dopant is de-doped from the conductive polymer component, the site from the dopant has been de-doped is re-doped with the acid component of the liquid component, thus making it likely that ESR is kept low. When the liquid component includes the acid component, if the antioxidant component includes the phenol antioxidant IA, the phenol antioxidant IA is likely to be inactivated in some cases. In the present disclosure, the activity of the phenol antioxidant IA can be maintained due to the alcohol solvent such as the first alcohol solvent being included in the liquid component, and a higher heat resistance property can be ensured.

Examples of the acid component include acids having a carbonyloxy bond (e.g., carboxylic acids, oxocarbonic acids, and Meldrum's acid), coordination compounds of acids having a carbonyloxy bond or phenol compounds, phenol compounds (e.g., picric acid, p-nitrophenol, pyrogallol, and catechol), sulfur-containing acids (e.g., sulfuric acid, sulfonic acids (e.g., aromatic sulfonic acids), and oxyaromatic sulfonic acids (e.g., phenol-2-sulfonic acid)), compounds having a sulfonyl imide bond, boron-containing acids (e.g., boric acid, halogenaged boric acids (e.g., tetrafluoroboric acid), and partial esters thereof), phosphorus-containing acids (e.g., phosphoric acid, halogenated phosphoric acids (e.g., hexafluorophosphoric acid), phosphonic acid, phosphinic acid, and partial esters thereof), nitrogen-containing acids (e.g., nitric acid and nitrous acid), and p-nitrobenzene. Examples of the carboxylic acid include aliphatic carboxylic acids and aromatic carboxylic acids (also including a sulfoaromatic carboxylic acids (e.g., p-sulfobenzoic acid, 3-sulfophthalic acid, and 5-sulfosalicylic acid). Aromatic carboxylic acids (particularly aromatic hydroxy acids (e.g., benzoic acid and salicylic acid) and aromatic polycarboxylic acids (e.g., phthalic acid and pyromellitic acid) are preferable from the viewpoint of high stability. Examples of the compound having a sulfonyl imide bond include saccharin, 1,2-benzenedisulfonic imide, cyclohexafluoropropane-1,3-bis(sulfonyl)imide, 4-methyl-N-[(4-methylphenyl) sulfonyl] benzenesulfonamide, dibenzenesulfonimide, trifluoromethanesulfonanilide, N-[(4-methylphenyl) sulfonyl]acetamide, benzenesulfonanilide, and N,N'-diphenylsulfamide. Examples of the coordination compound above include coordination compounds that include a central atom constituted of at least one selected from the group consisting of boron, aluminum, and silica, and an acid having a carbonyloxy bond that is linked to the central atom. Specific examples of the coordination compound include borodisalicylic acid, borodioxalic acid, borodiglycolic acid, borodigallic acid, borodicatechol, and borodipyrogallol. The liquid component may include one type of acid component or a combination of two or more types of acid components. Out of the acid components, aromatic carboxylic acids (e.g., phthalic acid, salicylic acid, and benzoic acid), the coordination compounds above (e.g., borodisalicylic acid, borodioxalic acid, and borodiglycolic acid) are preferable, and phthalic acid, salicylic acid, borodisalicylic acid, and the like are particularly preferable.

In the liquid component, the acid component may be in the form of a free acid, the form of an anion, or the form of a salt. All these forms may be encompassed in the acid component.

The liquid component may include a base component together with the acid component. The base component neutralizes at least a portion of the acid component. Therefore, it is possible to suppress corrosion of the electrode caused by the acid component while increasing the concentration of the acid component.

Examples of the base component include ammonia, amines (specifically, primary amines, secondary amines, tertiary amines), quaternary ammonium compounds, and amidinium compounds. The liquid component may include one type of base component or a combination of two or more types of base components.

The amine may be an aliphatic amine, an aromatic amine, or a heterocyclic amine. Examples of the amine include trimethylamine, diethylamine, ethyldimethylamine, triethylamine, ethylenediamine, aniline, pyrrolidine, imidazole (e.g., 1,2,3,4-tetramethylimidazolinium), and 4-dimethylaminopyridine. Examples of the quaternary ammonium compound include amidine compounds (including imidazole compounds).

In the liquid component, the base component may be in the form of a free base, the form of a cation, or the form of a salt. All these forms may be encompassed in the base component.

The molar ratio of the total amount of the acid component to the base component (=acid component/base component) may be, for example, 0.5 or more (or 1 or more) and 50 or less, or 1.1 or more (or 1.5 or more) and 20 or less. From the viewpoint of suppressing de-doping and making it likely that high conductivity of the conductive polymer is ensured, an excessively large amount of the acid component may be used compared with the base component.

From the viewpoint of making it more likely that the deterioration of the conductive polymer is suppressed, the pH of the liquid component may be 1 or more and 4 or less, or 1 or more and 3.5 or less.

From the viewpoint of ensuring high dissociability of the solute in the liquid component and making it likely that high film restorability of the dielectric layer is obtained, the concentration of the solute in the liquid component may be 0.1 mass % or more and 25 mass % or less, or 0.5 mass % or more and 25 mass % or less (or 15 mass % or less). Note that the concentration of the acid component is determined in terms of a free acid rather than an anion or a salt. Similarly, the concentration of the base component is determined in terms of a free base rather than a cation or a salt.

(Capacitor Element)

The capacitor element includes a conductive polymer. In general, the capacitor element includes at least an anode body provided with a dielectric layer on its surface, and a conductive polymer that covers a portion of the dielectric layer. The conductive polymer may form a solid electrolyte layer.

(Anode Body)

The anode body can include a valve metal, an alloy that includes a valve metal, a compound that includes a valve metal, and the like. One of these materials may be used alone, or two or more of them may be used in combination. For example, aluminum, tantalum, niobium, and titanium are preferably used as the valve metal. An anode body with a porous surface can be obtained by, for example, roughening the surface of a substrate (e.g., a foil-shaped substrate or a plate-shaped substrate) that includes a valve metal through etching or the like. The anode body may also be constituted by a molded article or sintered article of particles that include a valve metal. Note that the sintered article has a porous structure.

(Dielectric Layer)

The dielectric layer is formed through anodic oxidation caused by performing chemical conversion treatment or the like on the valve metal on the surface of the anode body. It is sufficient that the dielectric layer is formed so as to cover at least a portion of the anode body. In general, the dielectric layer is formed on the surface of the anode body. The dielectric layer is formed on the porous surface of the anode body and thus extends along the inner wall surfaces of the pores and pits on the surface of the anode body.

The dielectric layer includes a valve metal oxide. For example, a dielectric layer formed using tantalum as the valve metal includes $Ta_2O_5$, and a dielectric layer formed using aluminum as the valve metal includes $Al_2O_3$. Note that there is no limitation to such a dielectric layer as long as the dielectric layer functions as a dielectric. When the anode body has a porous surface, the dielectric layer is formed to extend along the surface of the anode body (including the inner wall surfaces of the pores).

(Conductive Polymer)

The conductive polymer includes, for example, a conjugated polymer and a dopant. The conductive polymer adheres to the dielectric layer so as to cover a portion of the dielectric layer. The conductive polymer that adheres to the surface of the dielectric layer may form a layer (which may be referred to as a "solid electrolyte layer"). The conductive polymer forms at least a portion of a cathode body in the electrolytic capacitor. The conductive polymer may further include an additive as necessary.

(Conjugated Polymer)

Examples of the conjugated polymer include known conjugated polymers used in electrolytic capacitors, such as π-conjugated polymers. Examples of the conjugated polymer include polymers whose basic skeletons are constituted of any of polypyrrole, polythiophene, polyaniline, polyfuran, polyacetylene, polyphenylene, polyphenylenevinylene, polyacene, and polythiophenevinylene. It is sufficient that the above-mentioned polymers include at least one type of monomer unit constituting the basic skeleton. The above-mentioned polymers also include homopolymers, copolymers of two or more monomers, and derivatives thereof (e.g., substitution products having a substituent). For example, polythiophene includes poly(3,4-ethylenedioxythiophene) and the like.

One of the conjugated polymers may be used alone, or two or more of them may be used in combination.

The weight average molecular weight (Mw) of the conjugated polymer is not particularly limited, but is, for example, 1,000 or more and 1,000,000 or less.

In this specification, the weight average molecular weight (Mw) is a value in terms of polystyrene obtained through gel permeation chromatography (GPC) measurement. Note that the GPC measurement is generally performed using a polystyrene gel column and water/methanol (volume ratio: 8/2) serving as a mobile phase.

(Dopant)

Examples of the dopant include anions having a relatively low molecular weight, and polymeric anions. Examples of the anion include a sulfate ion, a nitrate ion, a phosphate ion, a borate ion, organic sulfonate ions, and a carboxylate ion. Compounds that produce these anions are used as the dopant. Examples of a dopant that produces a sulfonate ion include p-toluenesulfonic acid and naphthalenesulfonic acid.

Examples of the polymeric anion include polyvinylsulfonic acid, polystyrenesulfonic acid, polyallylsulfonic acid, polyacrylsulfonic acid, polymethacrylsulfonic acid, poly(2-acrylamide-2-methylpropanesulfonic acid), polyisoprenesulfonic acid, polyestersulfonic acid (e.g., aromatic polyestersulfonic acid), phenolsulfonate novolac resin, and polyacrylic acid. The polymeric anion may be a polymer of a single type of monomer, a copolymer of two or more types of monomers, and a substitution product having a substituent. In particular, polyanions derived from polystyrenesulfonic acid are preferable.

However, these dopants are for illustrative purpose only, and there is no limitation thereto. One of the dopants may be used alone, or two or more of them may be used in combination.

The conductive polymer may be formed by, for example, performing at least one of chemical polymerization and electrolytic polymerization of a precursor of the conjugated polymer on the dielectric layer in the presence of the dopant. Alternatively, the conductive polymer may be formed by bringing a solution in which the conductive polymer is dissolved or a liquid dispersion in which the conductive polymer is dispersed into contact with the dielectric layer. The conductive polymer used in the solution or liquid dispersion can be obtained by performing polymerization of a precursor of the conjugated polymer in the presence of the dopant. Examples of the precursor of the conjugated polymer include a material monomer of the conjugated polymer, an oligomer and a prepolymer in which a plurality of material monomer molecule chains are connected to each other. One of the precursors may be used, or two or more of them may be used in combination.

The amount of the dopant included in the conductive polymer is, for example, 10 to 1000 parts by mass with respect to 100 parts by mass of the conjugated polymer and may be 20 to 500 parts by mass or 50 to 200 parts by mass.

In the present disclosure, the solid electrolyte layer may include the antioxidant component that includes the first antioxidant. When the electrolytic capacitor includes the liquid component, the solid electrolyte layer may include the antioxidant component due to infiltration of the antioxidant component dissolved in the liquid component into the solid electrolyte layer, but the antioxidant component may be added when the solid electrolyte layer is formed. Both of these procedures may be employed. The solid electrolyte layer may be formed by, for example, performing chemical polymerization or electrolytic polymerization using a polymerization solution that includes the antioxidant component. Also, the solid electrolyte layer may be formed using a solution or a liquid dispersion that includes the conductive polymer together with the antioxidant component.

The conductive polymer included in the electrolytic capacitor is analyzed according to the following procedure. First, the electrolytic capacitor is disassembled, the capacitor element is removed therefrom, and the surface of the capacitor element is polished to expose the surface of the conductive polymer (solid electrolyte). All the exposed conductive polymer is scraped off and dried under reduced pressure. A predetermined amount of the dried sample is collected, and the conductive polymer can be analyzed through $H^1$-NMR using the collected sample. The antioxidant component included in the solid electrolyte layer can also be analyzed through $H^1$-NMR similar to the analysis of the conductive polymer.

(Cathode Body)

A metal foil may also be used for a cathode body similarly to the anode body. There is no particular limitation on the type of metal, but it is preferable to use a valve metal such as aluminum, tantalum, or niobium, or an alloy that includes a valve metal. The surface of the metal foil may be roughened as necessary. The surface of the metal foil may be provided with a chemical film, or with a coating made of a metal (different type of metal) different from the metal constituting the metal foil or a non-metal. Examples of the different type of metal or the non-metal include a metal such as titanium and a non-metal such as carbon.

(Separator)

When a metal foil is used for the cathode body, a separator may be disposed between the metal foil and the anode body. There is no particular limitation on the separator, and, for example, a non-woven fabric that includes fibers made of cellulose, polyethylene terephthalate, vinylon, or a polyamide (e.g., an aliphatic polyamide or an aromatic polyamide such as aramid) may be used as the separator.

(Other Configurations)

The electrolytic capacitor may be a wound capacitor and may also be a chip capacitor or a layered capacitor. The electrolytic capacitor need only include at least one capacitor element and may include a plurality of capacitor elements. For example, the electrolytic capacitor may include a laminate of two or more capacitor elements or may include two or more wound capacitor elements. It is sufficient that the configuration of the capacitor element or the number of the capacitor elements are selected in accordance with the type or the application of the electrolytic capacitor.

(Container)

Examples of the material of the container include metals or alloys thereof such as aluminum, stainless steel, copper, iron, and brass. There is no particular limitation on the shape of the container as long as the container can contain the capacitor element and the liquid component.

(Sealing Body)

There is no particular limitation on the sealing body as long as it seals the opening of the container. In the present disclosure, even when the electrolytic capacitor is exposed to high temperatures, the presence of the first antioxidant in the electrolytic capacitor makes it possible to suppress deterioration of the sealing body that includes the elastic polymer and to obtain a high heat resistance property. Accordingly, the present disclosure is particularly suitable when the sealing body that includes the elastic polymer is used. The sealing body may further include a crosslinking agent for crosslinking the elastic polymer, an additive, and the like.

An insulating elastic polymer is used as the elastic polymer. Examples of the elastic polymer include butyl rubber, isoprene rubber, silicone rubber, fluoro rubber, ethylene-propylene rubber, and chlorosulfonated polyethylene rubber (e.g., Hypalon rubber). The sealing body may include one type of elastic polymer or a combination of two or more types of elastic polymers.

The proportion of the elastic polymer in the sealing body is, for example, 10 mass % or more, and may be 20 mass % or more. If the proportion of the elastic polymer is within such a range, the sealing body is likely to deteriorate under high-temperature environment. Even in such a case, using the above-mentioned liquid component makes it possible to suppress the deterioration of the elastic polymer and to ensure the high heat resistance property of the electrolytic capacitor. From the viewpoint of making it likely that the strength of the sealing body is ensured, it is preferable that the proportion of the elastic polymer is 50 mass % or less or 40 mass % or less. Note that, when the elastic polymer is crosslinked using a crosslinking agent, the proportion of the elastic polymer is the proportion of the elastic polymer that includes the crosslinking agent.

The elastic polymer constituting the sealing body is usually crosslinked using a crosslinking agent. In particular, an electrolytic capacitor provided with a sealing body that includes an elastic polymer crosslinked using at least one crosslinking agent selected from the group consisting of phenol resins (e.g., alkylphenol resin oligomers) and peroxides (e.g., organic peroxides) is suitable for applications that require particularly high thermal resistance. Even when such a sealing body is used, using a conventional liquid component may result in a failure to suppress deterioration of the sealing body under high-temperature environment due to an increase in the volume of the liquid component. With the present disclosure, even when such a sealing body that is intended to be used under high-temperature environment is used, the above-mentioned liquid component is used, thus making it possible to suppress the deterioration of the sealing body and to ensure a high heat resistance property.

At least one selected from the group consisting of, for example, reinforcing materials (e.g., carbon such as carbon black), antioxidants, anti-aging agents, crosslinking agents, crosslinking promotors, dispersion assistants, modifiers, vulcanizing agents, vulcanizing assistants, and processing assistants may be included as the additive.

From the viewpoint of further improving the effect of suppressing deterioration of the elastic polymer included in the sealing body, the mass ratio of the first antioxidant included in the electrolytic capacitor to the elastic polymer (=first antioxidant/elastic polymer) is, for example, 0.001 or more and 1 or less, and may be 0.005 or more and 0.5 or less, 0.01 or more and 0.3 or less (or 0.2 or less), or 0.01 or more and 0.1 or less.

The elastic polymer included in the sealing body is qualitatively and quantitatively analyzed, for example, according to the following procedure. First, the sealing body is dried for 1 hour under reduced pressure, and the mass of the sealing body is measured. Next, a sample is produced by cutting the sealing body, and the mass is measured. The sample is subjected to at least one of $H^1$-NMR and infrared absorption spectroscopy and thus components (e.g., the elastic polymer) included in the sealing body are identified. The sample can also be quantitatively analyzed through thermogravimetric analysis (TG or TGA). The obtained mass of the elastic polymer and the mass of the first antioxidant are used to determine the mass ratio "first antioxidant/elastic polymer".

Hereinafter, the electrolytic capacitor of the present disclosure will be more specifically described based on an embodiment. However, the electrolytic capacitor of the present disclosure is not limited to the following embodiment.

Figure 2:
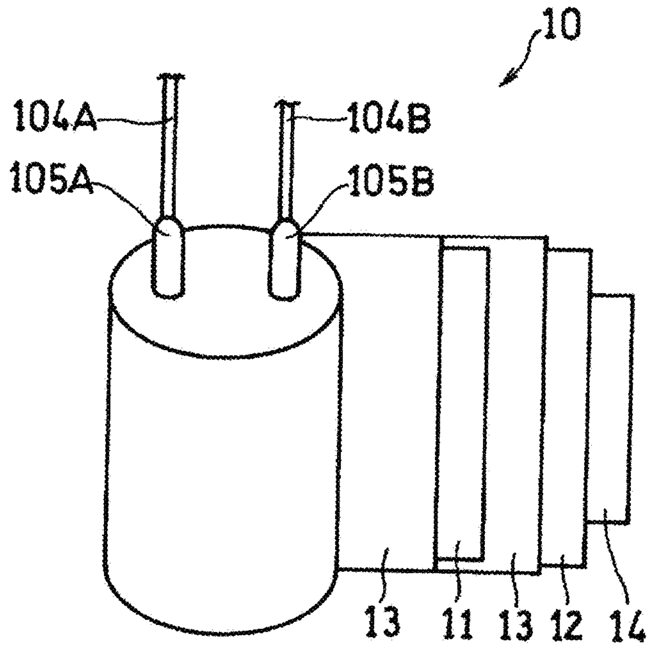
FIG. 2 is a schematic view of a capacitor element of the electrolytic capacitor shown in FIG. 1 with a portion thereof being developed.

FIG. 1 is a schematic cross-sectional view of an electrolytic capacitor according to this embodiment, and FIG. 2 is a schematic view of a capacitor element of this electrolytic capacitor with a portion thereof being developed.

The electrolytic capacitor includes, for example, a capacitor element 10, a bottomed case 101 that contains the capacitor element 10 and a liquid component (not illustrated), a sealing body 102 that blocks the opening of the bottomed case 101, a base plate 103 that covers the sealing body 102, lead wires 104A and 104B that are led out from the sealing body 102 and pass through the base plate 103, and lead tabs 105A and 105B that connect the lead wires and the electrodes of the capacitor element 10. A portion near the opening of the bottomed case 101 is drawn inward, and the opening end is curled so as to be swaged on the sealing body 102.

The capacitor element 10 is, for example, a wound body as shown in FIG. 2. The wound body includes an anode body 11 connected to the lead tab 105A, a cathode body 12 connected to the lead tab 105B, and separators 13. A conductive polymer layer (solid electrolyte layer) (not illustrated) is formed on the anode body 11. At least the conductive polymer layer (solid electrolyte layer) of the capacitor element 10 may be impregnated with the liquid component. The anode body 11 and the cathode body 12 are wound with the separator 13 being disposed therebetween. The outermost circumference of the wound body is fixed using fixation tape 14. Note that FIG. 2 shows the wound body, with a portion thereof being developed, before the outermost circumference of the wound body is fixed.

EXAMPLES

Hereinafter, the present invention will be specifically described based on examples and comparative examples, but the present invention is not limited to the following examples.

<<Production of Electrolytic Capacitors A1 to A9 and B1 and B2>>

Wound electrolytic capacitors (diameter 8 mm×L (length) 10 mm) with a rated voltage of 35 V and a rated capacitance of 150 μF were produced. Hereinafter, a specific method for manufacturing an electrolytic capacitor will be described.

(Preparation of Anode Body)

An aluminum foil with a thickness of 100 μm was etched and thus the surface of the aluminum foil was roughened. Thereafter, a dielectric layer was formed on the surface of the aluminum foil through chemical conversion treatment. The chemical conversion treatment was performed as follows: the aluminum foil was immersed in an ammonium adipate solution and applying a voltage of 60 V thereon. Then, the aluminum foil was cut to prepare an anode body.

(Preparation of Cathode Body)

An aluminum foil with a thickness of 50 μm was etched and thus the surface of the aluminum foil was roughened. Then, the aluminum foil was cut to prepare a cathode body.

(Preparation of Wound Body)

An anode lead tab and a cathode lead tab were connected to the anode body and the cathode body, respectively, and the anode body and the cathode body were wound with the separator being disposed therebetween while catching the lead tabs. An anode lead wire and a cathode lead wire were connected to the ends of the lead tabs protruding from the wound body. The chemical conversion treatment was performed on the produced wound body again, and a dielectric layer was formed on the cut end portion of the anode body. Next, the outer surface of the wound body was fixed using fixation tape to complete the wound body.

(Preparation of Liquid Mixture)

3,4-Ethylene dioxythiophene (EDOT) and polystyrenesulfonic acid (PSS, with a weight average molecular weight of 100,000) serving as a dopant were dissolved in ion-exchange water to prepare a mixed solution. Iron sulfate (III) (oxidizing agent) dissolved in ion-exchange water was added to the mixed solution while the mixed solution was agitated, and thus polymerization reaction was caused. After the reaction, the resulting reaction solution was dialyzed to remove the unreacted monomer and the excessive oxidizing agent, and thus a polymer dispersion (liquid mixture) that included polyethylene dioxythiophene doped with about 5 mass % of PSS (PEDOT/PSS) was obtained.

(Formation of Solid Electrolyte Layer)

In reduced pressure atmosphere (40 kPa), the wound body was immersed in the liquid mixture contained in a predetermined container for 5 minutes, and then the wound body was removed from the liquid mixture. Next, the wound body impregnated with the liquid mixture was dried in a drying furnace at 150° C. for 20 minutes, and at least a portion of the dielectric layer was covered by the conductive polymer to form a solid electrolyte layer. A capacitor element was formed in this manner.

(Preparation of Liquid Component (Liquid Electrolyte))

Solvents shown in Table 1 were mixed such that the ratio of each solvent in the sum of the solvents was as shown in Table 1. Antioxidants shown in Table 1, phthalic acid serving as the acid component, and triethylamine serving as the base component were added to the resulting mixed solvents and mixed. The acid component and the base component were used at a mass ratio of 12:5, and the addition amounts thereof were adjusted such that the total concentration in the liquid component was 25 mass %. The addition amounts of the antioxidants were adjusted such that the concentration of each antioxidant in the liquid component was as shown in Table 1. Note that the sum of the mixed solvent, the antioxidant, the acid component, and the base component was 100 mass %. The liquid components (liquid electrolytes) were thus prepared.

(Assembly of Electrolytic Capacitor)

The above-mentioned wound body on which the solid electrolyte layer had been formed was immersed in the liquid component for 5 minutes in reduced pressure atmosphere (40 kPa). The capacitor element impregnated with the liquid component was thus obtained. The resulting capacitor element was contained in a case, and the opening of the case was sealed using a sealing body. In this manner, the electrolytic capacitor as shown in FIG. 1 was completed. Thereafter, the electrolytic capacitor was aged at 130° C. for 2 hours while a rated voltage was applied thereto.

The sealing body was a butyl-rubber-containing disc-shaped elastic member obtained by kneading a butyl polymer, a peroxide crosslinking agent, and additives and molding the mixture using a mold. The additives were a reinforcing material (carbon black), a crosslinking promotor, a dispersion assistant (stearic acid), a hindered phenol anti-aging agent, and a modifier (silane coupling agent). The amounts of the components that were used were adjusted such that the content of butyl rubber, the elastic polymer in the sealing body, was 30 mass %.

[Evaluation: Measurement ESR and Capacitance]

An LCR meter for four-terminal measurement was used to measure an initial capacitance (mF) of each electrolytic capacitor at a frequency of 120 Hz and an initial ESR (mΩ) thereof at a frequency of 100 kHz, at 20° C. Then, the average values (initial capacitance: c0, initial ESR: r0) of the measured values obtained from the twenty solid electrolytic capacitors were determined.

Subsequently, reflow processing was performed on the solid electrolytic capacitor at 260° C. for 3 minutes. After the reflow processing, an accelerated test was performed by placing the electrolytic capacitor in a constant temperature oven with 145° C. atmosphere and holding the electrolytic capacitor for 5000 hours while applying a rated voltage thereto. Then, the capacitance and ESR were measured at 20° C. in the same manner as the measurement of the initial capacitance and the initial ESR, and the average values (capacitance after accelerated test: c1, ESR after accelerated test: r1) of the measured values obtained from the twenty solid electrolytic capacitors were determined. The amount of change in capacitance caused by the accelerated test (=c1−c0) was determined, and the ratio (%) of the amount of change in capacitance was calculated as the rate of change in capacitance (ΔCap) when the average c0 of the initial capacitances was defined as 100%. The amount of change in ESR caused by the accelerated test (=r1−10) was determined, and the ratio (%) of the amount of change in ESR was calculated as the rate of change in ESR (ΔESR) when the average 10 of the initial ESRs was defined as 100%.

The evaluation results are shown in Table 1. In Table 1, A1 to A9 are examples, and B1 and B2 are comparative examples.

TABLE 1

| | Non-aqueous solvent mass ratio | First antioxidant (mass %) | Second antioxidant (mass %) | Solute (mass %) | First antioxidant/ conductive polymer (mass ratio) | First antioxidant/ conjugated polymer (mass ratio) | First antioxidant/ monomer units (molar ratio) | First antioxidant/ elastic polymer (mass ratio) | Initial ESR (mΩ) | Initial Cap (μF) | ΔESR (%) | ΔCap (%) |
|---|---|---|---|---|---|---|---|---|---|---|---|---|
| A1 | EG/PEG/SL 25/50/25 | AA1 5% | — | 13 | 1.917 | 6.833 | 7.833 | 0.083 | 14 | 148 | 180 | −19 |
| A2 | | AA2 5% | — | | 1.917 | 6.833 | 11.123 | 0.083 | 14 | 147 | 190 | −20 |
| A3 | | AA1 1% | — | | 0.639 | 2.278 | 3.708 | 0.028 | 14 | 147 | 330 | −45 |
| A4 | | AA1 3% | — | | 1.917 | 6.833 | 7.833 | 0.083 | 14 | 148 | 240 | −28 |
| A5 | | AA1 10% | — | | 6.390 | 22.777 | 37.078 | 0.277 | 14 | 148 | 120 | −12 |
| A6 | | AA1 + AA2 3% + 3% | — | | 3.833 | 13.667 | 15.667 | 0.167 | 14 | 147 | 150 | −16 |
| A7 | EG/PEG/SL 10/50/40 | AA1 5% | — | | 1.917 | 6.833 | 7.833 | 0.083 | 16 | 147 | 220 | −22 |
| A8 | EG/PEG/SL 40/50/10 | AA1 5% | — | | 1.917 | 6.833 | 7.833 | 0.083 | 13 | 148 | 150 | −14 |
| A9 | EG 100 | AA1 5% | — | | 1.917 | 6.833 | 7.833 | 0.083 | 13 | 148 | 220 | −28 |
| B1 | EG/PEG/SL 25/50/25 | — | Pyrogallol 5% | 13 | 1.917 | 6.833 | 33.840 | 0.083 | 15 | 147 | 1030 | −63 |
| B2 | | — | Citric acid 5% | | 1.917 | 6.833 | 22.168 | 0.083 | 15 | 148 | 1280 | −79 |

EG: ethylene glycol
SL: sulfolane
PEG: polyethylene glycol (Mw = 300)
γBL: γ-butyrolactone
AA1: 4,4',4"-(1-methylpropanyl-3-ylidene)tris(6-tert-butyl-m-cresol)
AA2: 6,6'-di-tert-butyl-4,4'-butylidenedi-m-cresol As shown in Table 1, the initial ESR values and the initial capacitance values do not so greatly vary among Examples 1 to 9 and Comparative Examples 1 and 2. However, when only the second antioxidant having a boiling point of lower than 320° C. was used, the reduction rate of the capacitance was large and the rate of change in ESR also significantly increased (B1 and B2) after the accelerated test had been performed at 145° C. after the reflow processing. Meanwhile, in A1 in which the first antioxidant was used, both the reduction rate of the capacitance and the rate of change in ESR after the accelerated test were small, compared with B1 and B2.

was checked, revealing that at least a portion of the antioxidant remained undissolved in the liquid component.

The results are shown in Table 2. In Table 2, A10 to A19 are examples. The results from A1 and B1 are also shown in Table 2.

TABLE 2

| | Non-aqueous solvent mass ratio | First antioxidant (mass %) | Second antioxidant (mass %) | Solute (mass %) | First antioxidant/ conductive polymer (mass ratio) | First antioxidant/ conjugated polymer (mass ratio) | First antioxidant/ monomer units (molar ratio) | First antioxidant/ elastic polymer (mass ratio) | Initial ESR (mΩ) | Initial Cap (μF) | ΔESR (%) | ΔCap (%) |
|---|---|---|---|---|---|---|---|---|---|---|---|---|
| A1 | EG/PEG/SL 25/50/25 | AA1 5% | — | 13 | 1.917 | 6.833 | 7.833 | 0.083 | 14 | 148 | 180 | −19 |
| A10 | EG/PEG/SL 25/50/25 | Catechin 5% | — | 13 | 1.917 | 6.833 | 14.719 | 0.083 | 13 | 149 | 190 | −21 |
| A11 | | Chrysin 5% | — | | 1.917 | 6.833 | 16.810 | 0.083 | 14 | 147 | 220 | −21 |
| A12 | | Anthocyanin 5% | — | | 1.917 | 6.833 | 20.625 | 0.083 | 13 | 148 | 200 | −23 |
| A13 | | Ascorbic acid 5% | — | | 1.917 | 6.833 | 24.260 | 0.083 | 13 | 147 | 200 | −22 |
| A14 | | Chlorogenic acid 5% | — | | 1.917 | 6.833 | 12.063 | 0.083 | 14 | 146 | 250 | −25 |
| A15 | | AA3 5% | — | | 1.917 | 6.833 | 3.627 | 0.083 | 15 | 148 | 210 | −22 |
| A16 | | AA4 5% | — | | 1.917 | 6.833 | 7.324 | 0.083 | 14 | 147 | 200 | −21 |
| A17 | | AA3 + AA5 3% + 3% | — | | 2.300 | 8.200 | 6.223 | 0.100 | 14 | 148 | 230 | −24 |
| A18 | | AA6 5% | — | | 1.917 | 6.833 | 10.544 | 0.083 | 14 | 147 | 140 | −15 |
| A19 | | AA7 5% | — | | 1.917 | 6.833 | 11.327 | 0.083 | 13 | 147 | 130 | −16 |
| B1 | EG/PEG/SL 25/50/25 | — | Pyrogallol 5% | 13 | 1.917 | 6.833 | 33.879 | 0.083 | 15 | 147 | 1030 | −63 |

EG: ethylene glycol
SL: sulfolane
PEG: polyethylene glycol (Mw = 300)
AA1: 4,4',4"-(1-methylpropanyl-3-ylidene)tris(6-tert-butyl-m-cresol)
AA3: pentaerythritol tetrakis[3-(3,5-di-tert-butyl-4-hydroxyphenyl)propionate]
AA4: 2,2'-methylenebis(4,6-di-tert-butylphenyl)2-ethylhexylphosphite
AA5: 3,9-bis(2,6-di-tert-butyl-4-methylphenoxy)-2,4,8,10-tetraoxa-3,9-diphosphaspiro[5.5]undecane
AA6: 2,4,6-tris(2,4-dihydroxyphenyl)-1,3,5-triazine
AA7: 4,4',4"-(1-methylpropanyl-3-ylidene)tris(m-cresol)

Also, when the type or amount of the first antioxidant or the composition of the non-aqueous solvent was changed, the effects as high as those of A1 were obtained (A2 to A9). As described above, in A1 to A9, the electrolytic capacitors had an excellent heat resistance property.

<<Electrolytic Capacitors A10 to A19>>

A liquid component was prepared in the same manner as in the case of the electrolytic capacitor A1, except that the antioxidant was not used. The capacitor element was impregnated with the liquid component in the same manner as in the case of the electrolytic capacitor A1, except that the resulting liquid component was used. The antioxidant in an amount shown in Table 2 was placed in the case, and then the capacitor element impregnated with the liquid component was placed in the case. Note that, in A10 to A19, the amount (mass %) of the first antioxidant shown in Table 2 means the ratio of the amount of the first antioxidant in the total amount of the liquid component and the first antioxidant. Electrolytic capacitors were completed and aged in the same manner as in the case of the electrolytic capacitor A1, except the changes above. The obtained electrolytic capacitors were used and evaluated in the same manner as described above. After the evaluation, each of the electrolytic capacitors was disassembled and the bottom of the case As shown in Table 2, in A10 to A19, at least a portion of the first antioxidant remained undissolved in the liquid component. Nevertheless, both the reduction rate of the capacitance and the rate of change in ESR after the accelerated test were as small as those of A1, and it is found that a high heat resistance property was ensured.

<<Electrolytic Capacitors A20 and B3>

In the formation of the solid electrolyte layer, the antioxidant was added to the liquid mixture such that the concentration shown in Table 3 was obtained. The solid electrolyte layer was formed using the resulting liquid mixture. In addition, the liquid component (liquid electrolyte) was not used. Electrolytic capacitors were completed and aged in the same manner as in the case of the electrolytic capacitor A1, except the changes above. The obtained electrolytic capacitors were used and evaluated in the same manner as described above.

The results are shown in Table 3. In Table 3, A20 is an example, and B3 is a comparative example.

TABLE 3

| | First antioxidant (mass %) | Second antioxidant (mass %) | First antioxidant/ conductive polymer (mass ratio) | First antioxidant/ conjugated polymer (mass ratio) | First antioxidant/ monomer units (molar ratio) | First antioxidant/ elastic polymer (mass ratio) | Initial ESR (mΩ) | Initial Cap (μF) | ΔESR (%) | ΔCap (%) |
|---|---|---|---|---|---|---|---|---|---|---|
| A20 | AA1 5% | — | 1.917 | 6.833 | 7.833 | 0.083 | 14 | 148 | 210 | −24 |
| B3 | — | Pyrogallol 5% | 1.917 | 6.833 | 33.879 | 0.083 | 15 | 147 | 1290 | −76 |

AA1: 4,4',4"-(1-methylpropanyl-3-ylidene)tris(6-tert-butyl-m-cresol)

As shown in Table 3, even when the solid electrolyte layer contained the antioxidant component, using the first antioxidant resulted in the effects as high as those of A1 shown in Table 1 and an excellent heat resistance property.

<<Production of Electrolytic Capacitors A21 to A28 and B4 to B6>>

In the preparation of the liquid component (liquid electrolyte), solvents shown in Table 4 were mixed such that the ratio of each solvent in the sum of the solvents was as shown in Table 4. The antioxidants shown in Table 4 were used, and the addition amounts of the antioxidants were adjusted such that the concentration of each antioxidant in the liquid component was as shown in Table 4. Electrolytic capacitors were completed and aged in the same manner as in the case of the electrolytic capacitor A1, except the changes above. The obtained electrolytic capacitors were used and evaluated in the same manner as described above.

The evaluation results are shown in Table 4. In Table 4, A21 to A28 are examples, and B4 to B6 are comparative examples.

only the second antioxidant having a boiling point of lower than 320° C. was used, the reduction rate of the capacitance was large and the rate of change in ESR also significantly increased (B4 and B5) after the accelerated test had been performed at 145° C. after the reflow processing. Meanwhile, in A21 in which the first antioxidant was used, both the reduction rate of the capacitance and the rate of change in ESR after the accelerated test were small, compared with B4 and B5. In addition, when the first antioxidant was used but an alcohol solvent was not used as the non-aqueous electrolyte, the reduction rate of the capacitance was significantly large and the rate of change in ESR also significantly increased (B6). That is to say, it is conceivable that using, in A21, the first antioxidant and the non-aqueous solvent that included an alcohol solvent resulted in suppression of deactivation of the first antioxidant even in high-temperature environment and effective suppression of deterioration of the conductive polymer or the sealing body.

Also, when the type or amount of the first antioxidant or the composition of the non-aqueous solvent was changed,

TABLE 4

| | Non-aqueous solvent mass ratio | First antioxidant (mass %) | Second antioxidant (mass %) | Solute (mass %) | First antioxidant/ conductive polymer (mass ratio) | First antioxidant/ conjugated polymer (mass ratio) | First antioxidant/ monomer units (molar ratio) | First antioxidant/ elastic polymer (mass ratio) | Initial ESR (mΩ) | Initial Cap (μF) | ΔESR (%) | ΔCap (%) |
|---|---|---|---|---|---|---|---|---|---|---|---|---|
| A21 | EG/PEG/SL 25/50/25 | AA1 3% | — | 13 | 1.150 | 4.100 | 4.700 | 0.050 | 14 | 147 | 174 | −16 |
| A22 | | AA2 3% | — | | 1.150 | 4.100 | 6.674 | 0.050 | 13 | 147 | 184 | −17 |
| A23 | | AA1 1% | — | | 0.383 | 1.367 | 2.225 | 0.017 | 14 | 148 | 186 | −24 |
| A24 | | AA1 10% | — | | 3.833 | 13.667 | 22.247 | 0.167 | 14 | 147 | 112 | −9 |
| A25 | | AA1 + AA2 3% + 3% | — | | 2.300 | 8.200 | 11.374 | 0.100 | 13 | 147 | 143 | −13 |
| A26 | EG/PEG/SL 10/50/40 | AA1 3% | — | | 1.150 | 4.100 | 4.700 | 0.050 | 16 | 148 | 200 | −20 |
| A27 | EG/PEG/SL 40/50/10 | AA1 3% | — | | 1.150 | 4.100 | 4.700 | 0.050 | 14 | 148 | 141 | −13 |
| A28 | EG 100 | AA1 3% | — | | 1.150 | 4.100 | 4.700 | 0.050 | 13 | 149 | 180 | −22 |
| B4 | EG/PEG/SL 25/50/25 | — | Pyrogallol 3% | 13 | 1.150 | 4.100 | 20.304 | 0.050 | 14 | 148 | 380 | −36 |
| B5 | | — | Citric acid 3% | | 1.150 | 4.100 | 13.301 | 0.050 | 15 | 147 | 410 | −42 |
| B6 | γBL/SL 50/50 | AA1 3% | — | | 1.150 | 4.100 | 4.700 | 0.050 | 16 | 148 | 520 | −50 |

EG: ethylene glycol
SL: sulfolane
PEG: polyethylene glycol (Mw = 300)
γBL: γ-butyrolactone
AA1: 4,4',4"-(1-methylpropanyl-3-ylidene)tris(6-tert-butyl-m-cresol)
AA2: 6,6'-di-tert-butyl-4,4'-butylidenedi-m-cresol As shown in Table 4, the initial ESR values and the initial capacitance values do not so greatly vary among the examples and the comparative examples. However, when the effects as high as those of A21 were obtained (A22 to A28). As described above, in A21 to A28, the electrolytic capacitors had an excellent heat resistance property.

<<Electrolytic Capacitors A29 to A38>>

Liquid components were prepared in the same manner as in the case of the electrolytic capacitor A21, except that the first antioxidants shown in Table 5 or 6 were used in such addition amounts that achieved the concentrations shown in Table 5 or 6. Electrolytic capacitors were completed and aged in the same manner as in the case of the electrolytic capacitor A1, except that the resulting liquid components were used. The obtained electrolytic capacitors were used and evaluated in the same manner as described above.

The results are shown in Table 5 or 6. In Table 5 or 6, A29 to A38 are examples. The results from A21 and B4 are also shown in Tables 5 and 6.

As shown in Tables 5 and 6, even when the type of first antioxidant was changed, the effects as high as those of A21 were obtained, and an excellent heat resistance property was obtained (A29 to A38).

Although the present invention has been described in terms of the presently preferred embodiments, it is to be understood that such a disclosure is not to be interpreted as limiting. Various alterations and modifications will no doubt become apparent to those skilled in the art to which the present invention pertains, after having read the above disclosure. Accordingly, it is intended that the appended

TABLE 5

| | Non-aqueous solvent mass ratio | First antioxidant (mass %) | Second antioxidant (mass %) | Solute (mass %) | First antioxidant/ conductive polymer (mass ratio) | First antioxidant/ conjugated polymer (mass ratio) | First antioxidant/ monomer units (molar ratio) | First antioxidant/ elastic polymer (mass ratio) | Initial ESR (mΩ) | Initial Cap (μF) | ΔESR (%) | ΔCap (%) |
|---|---|---|---|---|---|---|---|---|---|---|---|---|
| A21 | EG/PEG/SL 25/50/25 | AA1 3% | — | 13 | 1.150 | 4.100 | 4.700 | 0.050 | 14 | 147 | 174 | −16 |
| A29 | EG/PEG/SL 25/50/25 | AA3 3% | — | 13 | 1.150 | 4.100 | 2.174 | 0.050 | 15 | 148 | 190 | −20 |
| A30 | | AA4 3% | — | | 1.150 | 4.100 | 4.394 | 0.050 | 14 | 147 | 180 | −18 |
| A31 | | AA3 + AA5 3% + 3% | — | | 1.150 | 4.100 | 4.047 | 0.050 | 14 | 148 | 200 | −20 |
| A32 | | Ascorbic acid 3% | — | | 1.150 | 4.100 | 14.523 | 0.050 | 13 | 147 | 180 | −19 |
| A33 | | Chlorogenic acid 3% | — | | 1.150 | 4.100 | 7.238 | 0.050 | 14 | 146 | 120 | −21 |
| A34 | | AA6 3% | — | | 1.150 | 4.100 | 6.345 | 0.050 | 14 | 147 | 120 | −12 |
| A35 | | AA7 3% | — | | 1.150 | 4.100 | 6.815 | 0.050 | 13 | 147 | 110 | −13 |
| B4 | EG/PEG/SL 25/50/25 | — | Pyrogallol 3% | 13 | 1.150 | 4.100 | 20.304 | 0.050 | 14 | 148 | 380 | −36 |

EG: ethylene glycol
SL: sulfolane
PEG: polyethylene glycol (Mw = 300)
AA1: 4,4',4"-(1-methylpropanyl-3-ylidene)tris(6-tert-butyl-m-cresol)
AA3: pentaerythritol tetrakis[3-(3,5-di-tert-butyl-4-hydroxyphenyl)propionate]
AA4: 2,2'-methylenebis(4,6-di-tert-butylphenyl)2-ethylhexylphosphite
AA5: 3,9-bis(2,6-di-tert-butyl-4-methylphenoxy)-2,4,8,10-tetraoxa-3,9-diphosphaspiro[5.5]undecane
AA6: 2,4,6-tris(2,4-dihydroxyphenyl)-1,3,5-triazine
AA7: 4,4',4"-(1-methylpropanyl-3-ylidene)tris(m-cresol)

TABLE 6

| | Non-aqueous solvent mass ratio | First antioxidant (mass %) | Second antioxidant (mass %) | Solute (mass %) | First antioxidant/ conductive polymer (mass ratio) | First antioxidant/ conjugated polymer (mass ratio) | First antioxidant/ monomer units (molar ratio) | First antioxidant/ elastic polymer (mass ratio) | Initial ESR (mΩ) | Initial Cap (μF) | ΔESR (%) | ΔCap (%) |
|---|---|---|---|---|---|---|---|---|---|---|---|---|
| A21 | EG/PEG/SL 25/50/25 | AA1 3% | — | 13 | 1.150 | 4.100 | 4.700 | 0.050 | 14 | 147 | 174 | −16 |
| A36 | EG/PEG/SL 25/50/25 | Catechin 3% | — | 13 | 1.150 | 4.100 | 8.833 | 0.050 | 13 | 148 | 170 | −18 |
| A37 | | Chrysin 3% | — | | 1.150 | 4.100 | 10.085 | 0.050 | 13 | 147 | 200 | −19 |
| A38 | | Anthocyanin 3% | — | | 1.150 | 4.100 | 12.374 | 0.050 | 13 | 147 | 180 | −19 |
| B4 | EG/PEG/SL 25/50/25 | — | Pyrogallol 3% | 13 | 1.150 | 4.100 | 20.304 | 0.050 | 14 | 148 | 380 | −36 |

EG: ethylene glycol
SL: sulfolane
PEG: polyethylene glycol (Mw = 300)

claims be interpreted as covering all alterations and modifications as fall within the true spirit and scope of the invention.

INDUSTRIAL APPLICABILITY

The electrolytic capacitor of the present disclosure and the liquid component for an electrolytic capacitor of the present disclosure are suitable for use in hybrid electrolytic capacitors. The electrolytic capacitor is particularly suitable for applications that are required to have a high heat resistance property. However, the applications of the liquid component for an electrolytic capacitor and the electrolytic capacitor are not limited thereto.

REFERENCE SIGNS LIST

100: Electrolytic capacitor, 101: Bottomed case, 102: Sealing body, 103: Base plate, 104A, 104B: Lead wire, 105A, 105B: Leads tab, 10: Capacitor element, 11: Anode body, 12: Cathode body, 13: Separator, 14: Fixation tape

The invention claimed is:

1. An electrolytic capacitor comprising:

a container with an opening;

a capacitor element and a liquid component contained in the container; and a sealing body that seals the opening, wherein the capacitor element includes an anode body provided with a dielectric layer on its surface, and a conductive polymer that covers a portion of the dielectric layer, the sealing body includes an elastic polymer, an antioxidant component is present in a space closed by the container and the sealing body, the antioxidant component includes a first antioxidant, the liquid component includes a non-aqueous solvent, the non-aqueous solvent includes at least an alcohol solvent, and at least a portion of the first antioxidant is present in a state of being undissolved in the liquid component.

2. The electrolytic capacitor according to claim 1, wherein the first antioxidant includes at least one selected from the group consisting of a hydroxy group, a nitrogen atom, an oxygen atom, a sulfur atom, and a phosphorus atom.

3. The electrolytic capacitor according to claim 1, wherein the first antioxidant at least includes at least one selected from the group consisting of a phenol antioxidant having a phenolic hydroxy group and a phosphorus antioxidant.

4. The electrolytic capacitor according to claim 1, wherein the first antioxidant at least includes a phenol antioxidant having two or more phenolic hydroxy groups.

5. The electrolytic capacitor according to claim 1, wherein the first antioxidant at least includes a phenol compound having a tertiary carbon atom or quaternary carbon atom linked to an aromatic ring of the phenol compound.

6. The electrolytic capacitor according to claim 1, wherein the alcohol solvent at least includes at least one selected from the group consisting of an alkylene glycol having 2 to 6 carbon atoms and glycerin.

7. The electrolytic capacitor according to claim 1, wherein a ratio of the alcohol solvent in the non-aqueous solvent is 5 mass % or more and 100 mass % or less.

8. The electrolytic capacitor according to claim 1, wherein the electrolytic capacitor includes a solid electrolyte layer that includes the conductive polymer and covers a portion of the dielectric layer, and the solid electrolyte layer includes the first antioxidant.

9. The electrolytic capacitor according to claim 1, wherein a mass ratio of the first antioxidant to the conductive polymer is 0.01 or more and 300 or less.

10. The electrolytic capacitor according to claim 1, wherein the conductive polymer includes a conjugated polymer and a dopant, and a molar ratio of the first antioxidant to a total monomer units of the conjugated polymer is 0.1 or more and 200 or less.

11. The electrolytic capacitor according to claim 1, wherein a mass ratio of the first antioxidant to the elastic polymer is 0.001 or more and 1 or less.

12. A liquid component for an electrolytic capacitor, comprising:

a non-aqueous solvent; and an antioxidant component, wherein the non-aqueous solvent includes at least an alcohol solvent, the antioxidant component includes a first antioxidant, a portion of the antioxidant component is dissolved in the non-aqueous solvent, and at least a portion of the first antioxidant is present in a state of being undissolved in the liquid component.

13. The liquid component for an electrolytic capacitor according to claim 12, wherein the first antioxidant at least includes at least one selected from the group consisting of a phenol antioxidant having a phenolic hydroxy group and a phosphorus antioxidant.

14. The liquid component for an electrolytic capacitor according to claim 13, wherein the phenol antioxidant includes at least one selected from the group consisting of (a) a phenol antioxidant in which an aromatic ring has one or two or more phenolic hydroxy group and at least one selected from the group consisting of an alkyl group having 1 to 4 carbon atoms and an alkoxy group having 1 to 4 carbon atoms, (b) a phenol antioxidant in which an aromatic ring has one or two or more phenolic hydroxy group and a hydrogen atom is linked to at least one of carbon atoms adjacent to a carbon atom having the phenolic hydroxy group, and (c) a phenol antioxidant in which an aromatic ring has one or two or more phenolic hydroxy group and have no substituents.

15. The liquid component for an electrolytic capacitor according to claim 12, wherein a concentration of the first antioxidant in the liquid component for an electrolytic capacitor is 0.1 mass % or more and 50 mass % or less.

16. The liquid component for an electrolytic capacitor according to claim 12, wherein the alcohol solvent at least includes at least one first alcohol solvent selected from the group consisting of an alkylene glycol having 2 to 6 carbon atoms and glycerin.

17. The liquid component for an electrolytic capacitor according to claim 16, wherein a mass ratio of the first antioxidant to the first alcohol solvent is 0.005 or more and 2 or less.

18. An electrolytic capacitor comprising:

a container with an opening;

a capacitor element contained in the container; and a sealing body that seals the opening, wherein the capacitor element includes an anode body provided with a dielectric layer on its surface, and a conductive polymer that covers a portion of the dielectric layer, the sealing body includes an elastic polymer, an antioxidant component is present in a space closed by the container and the sealing body, the antioxidant component includes a first antioxidant, and the first antioxidant is at least one selected from the group consisting of amine antioxidants, benzimidazole antioxidants, carotenoid compounds, water-soluble vitamins, glutathione, sesamine, melatonin, and flavonoid compounds.

19. A liquid component for an electrolytic capacitor, comprising:

a non-aqueous solvent; and an antioxidant component dissolved in the non-aqueous solvent, wherein the non-aqueous solvent includes at least an alcohol solvent, the antioxidant component includes a first antioxidant, and the first antioxidant is at least one selected from the group consisting of amine antioxidants, benzimidazole antioxidants, carotenoid compounds, water-soluble vitamins, glutathione, sesamine, melatonin, and flavonoid compounds.

* * * * *